United States Patent [19]
Robb et al.

[11] Patent Number: 5,682,263
[45] Date of Patent: Oct. 28, 1997

[54] BROAD-BAND ULTRAVIOLET LENS SYSTEMS WELL-CORRECTED FOR CHROMATIC ABERRATION

[75] Inventors: Paul N. Robb, Santa Clara; Robert D. Sigler, Cupertino, both of Calif.

[73] Assignee: Lockheed Missiles & Space Company, Inc., Sunnyvale, Calif.

[21] Appl. No.: 195,000

[22] Filed: Feb. 14, 1994

[51] Int. Cl.⁶ .................. G02B 13/14; G02B 1/06; G02B 3/12

[52] U.S. Cl. .................. 359/355; 359/358; 359/350; 359/665; 359/666

[58] Field of Search .................. 359/350, 355, 359/358, 665, 666, 667

[56] References Cited

U.S. PATENT DOCUMENTS

| | | | |
|---|---|---|---|
| 695,606 | 3/1902 | Grün | 359/665 |
| 2,326,970 | 8/1943 | Räntsch | 359/665 |
| 4,302,079 | 11/1981 | White | 359/665 |
| 4,783,153 | 11/1988 | Kushibiki et al. | 359/665 |
| 4,832,472 | 5/1989 | Robb | 359/355 |
| 4,913,535 | 4/1990 | Robb | 359/665 |
| 4,915,483 | 4/1990 | Robb | 359/665 |
| 4,932,762 | 6/1990 | Robb | 359/665 |
| 4,958,919 | 9/1990 | Sigler | 359/665 |
| 5,091,801 | 2/1992 | Ebstein | 359/665 |
| 5,345,337 | 9/1994 | Sigler | 359/665 |

OTHER PUBLICATIONS

"Properties of Oriel Materials," *Optics and Filters*, Oriel Corporation, Stratford, Connecticut, vol. III, 1990, pp. 12–3 to 12–8.

*Primary Examiner*—Thong Nguyen
*Assistant Examiner*—Audrey Chang
*Attorney, Agent, or Firm*—Feix & Feix; Henry Groth

[57] ABSTRACT

Design forms are disclosed for lens triplets comprising a liquid lens element, which are well-corrected for chromatic aberration over a broad wavelength band extending from the ultraviolet region through the visible region into the near infrared region of the electromagnetic spectrum.

6 Claims, 18 Drawing Sheets

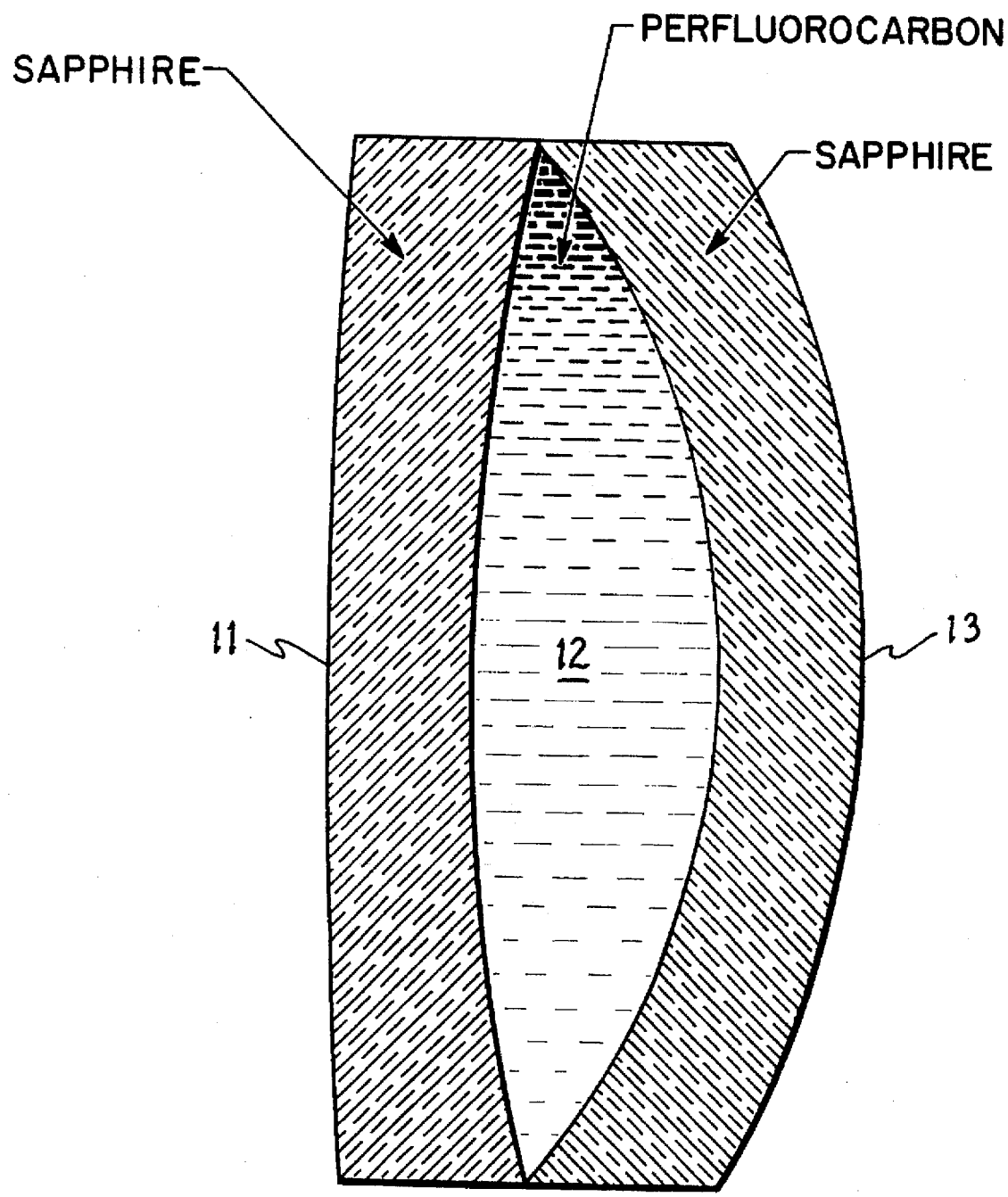

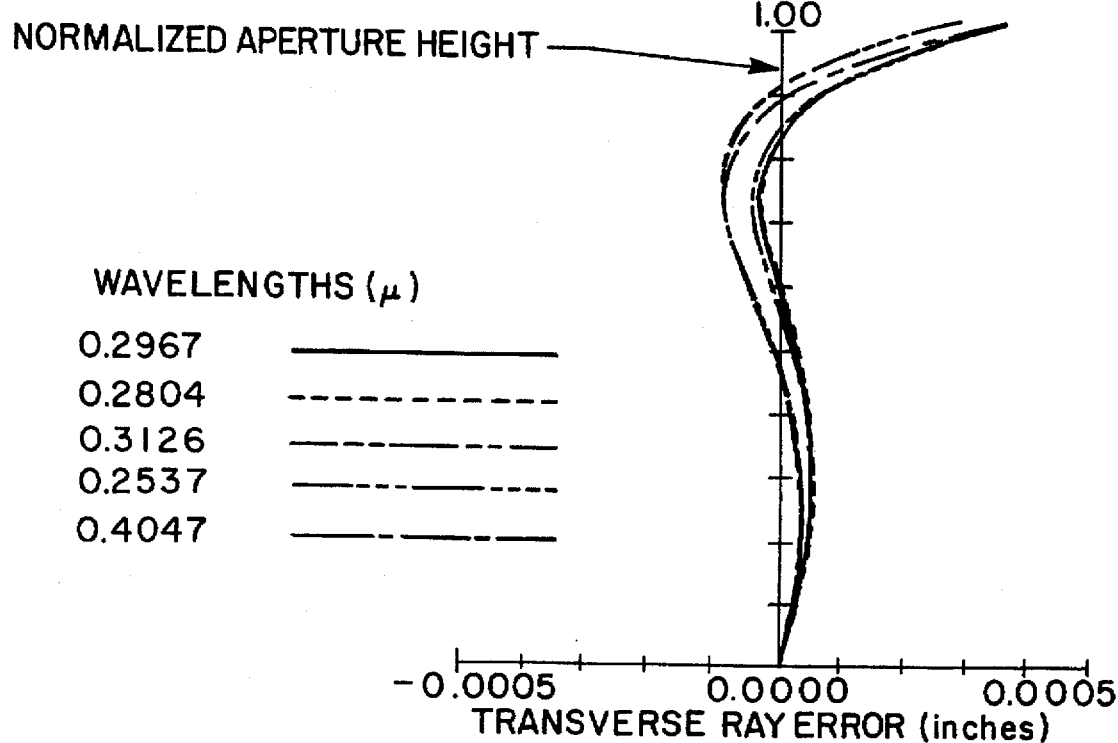
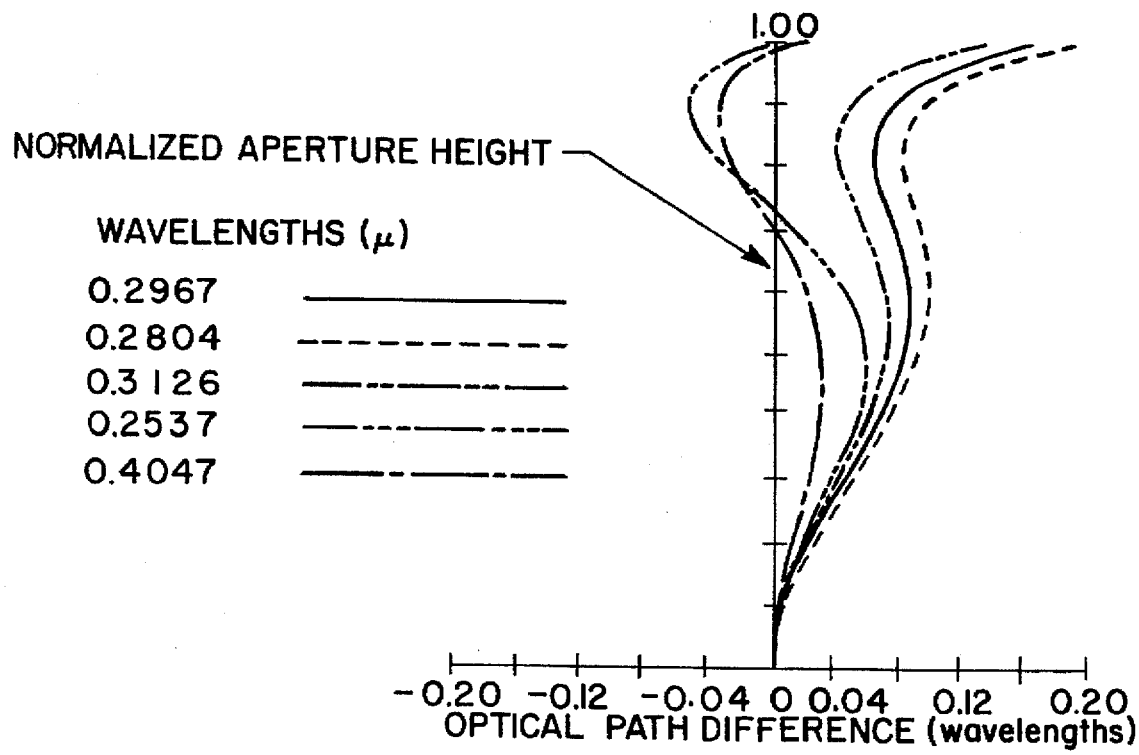

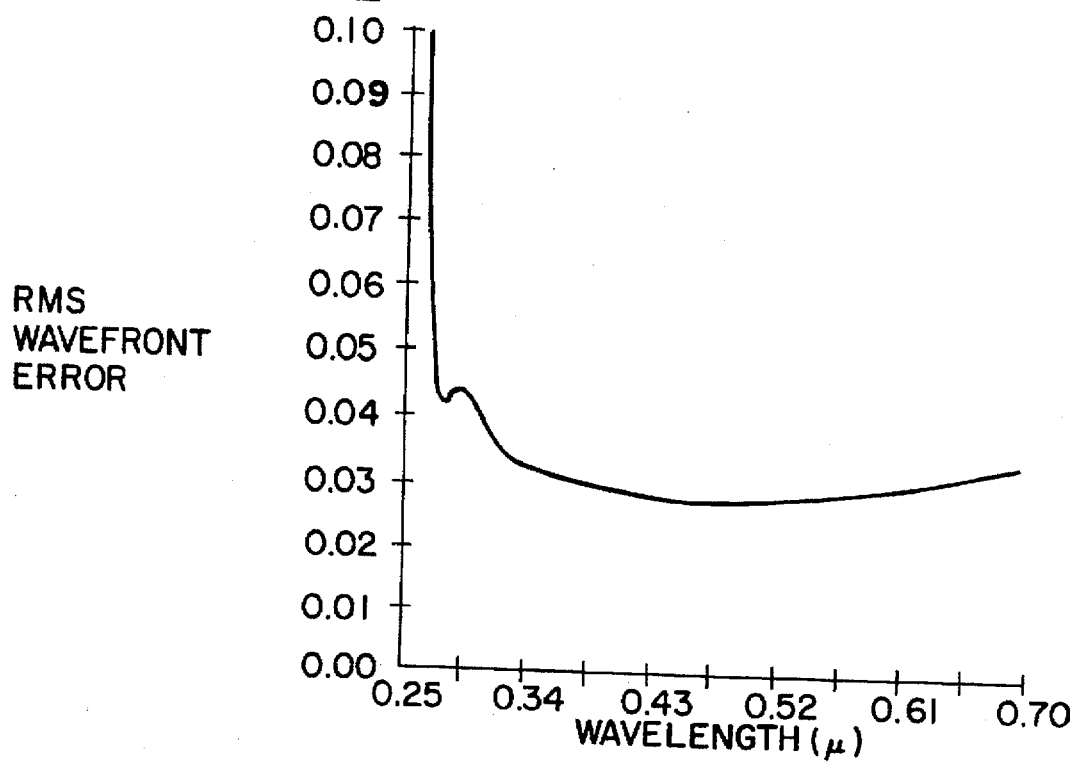
FIG_4
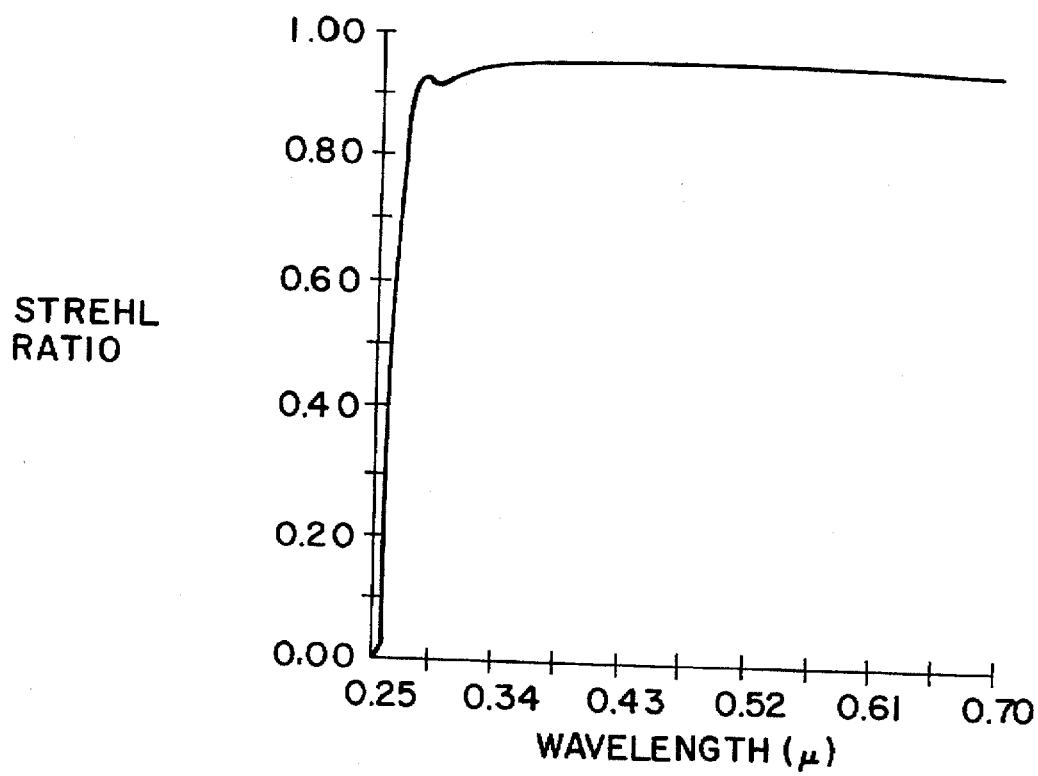
FIG_5

FIG_6
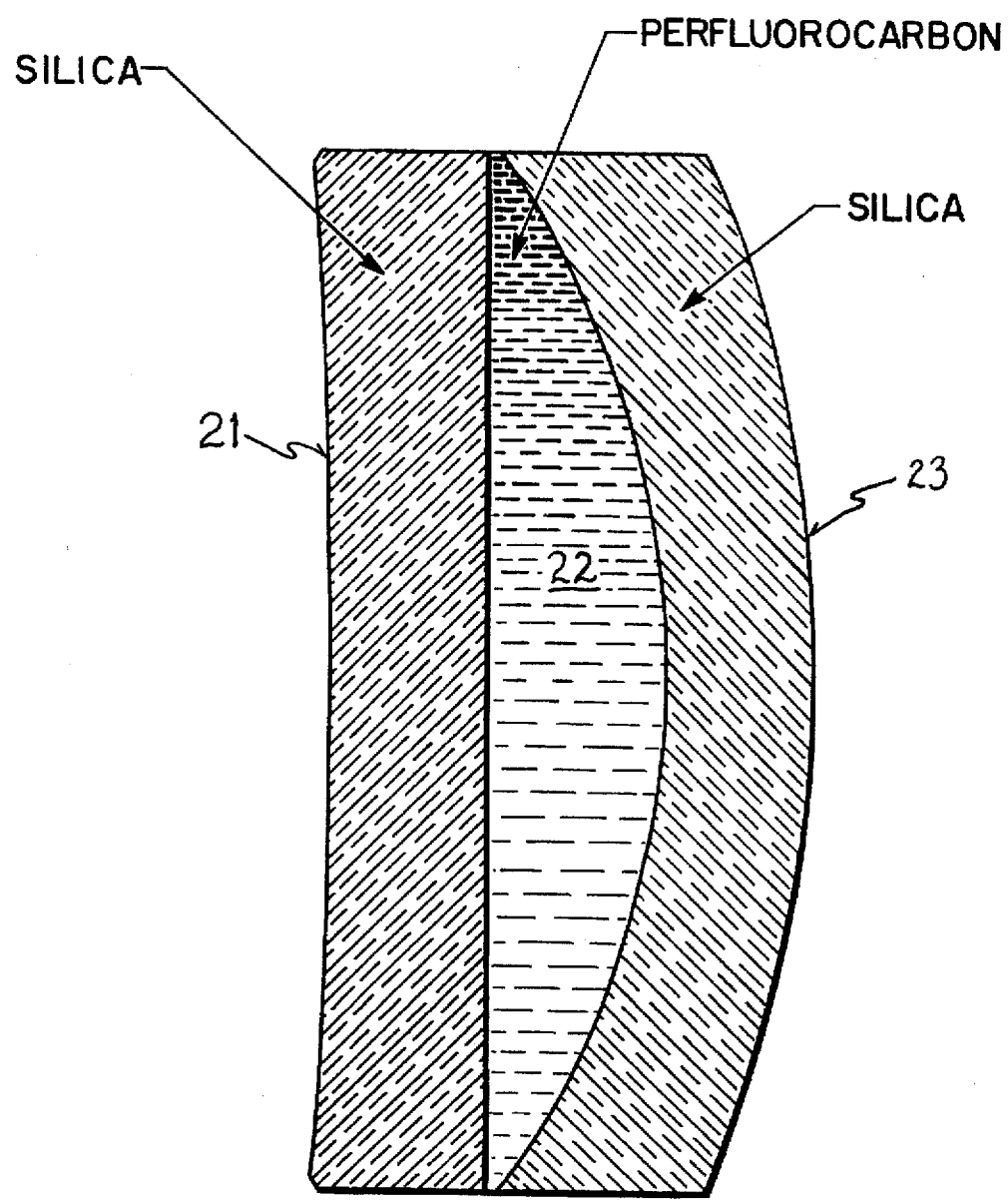

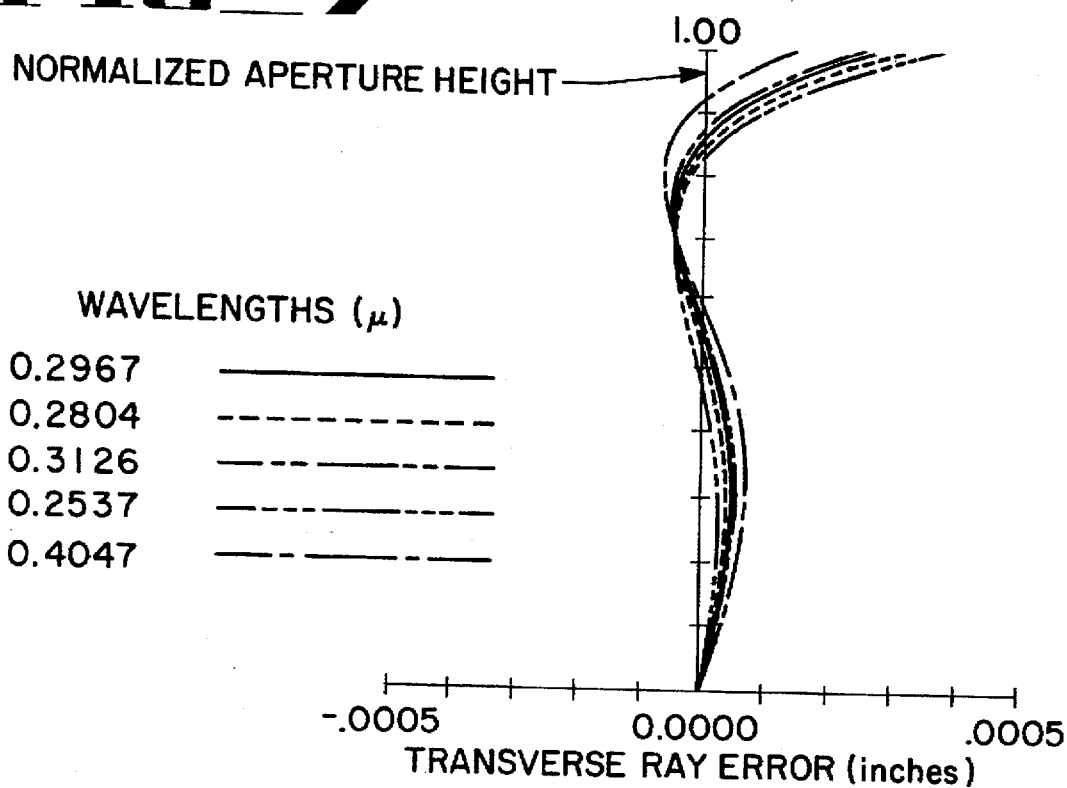
FIG_7
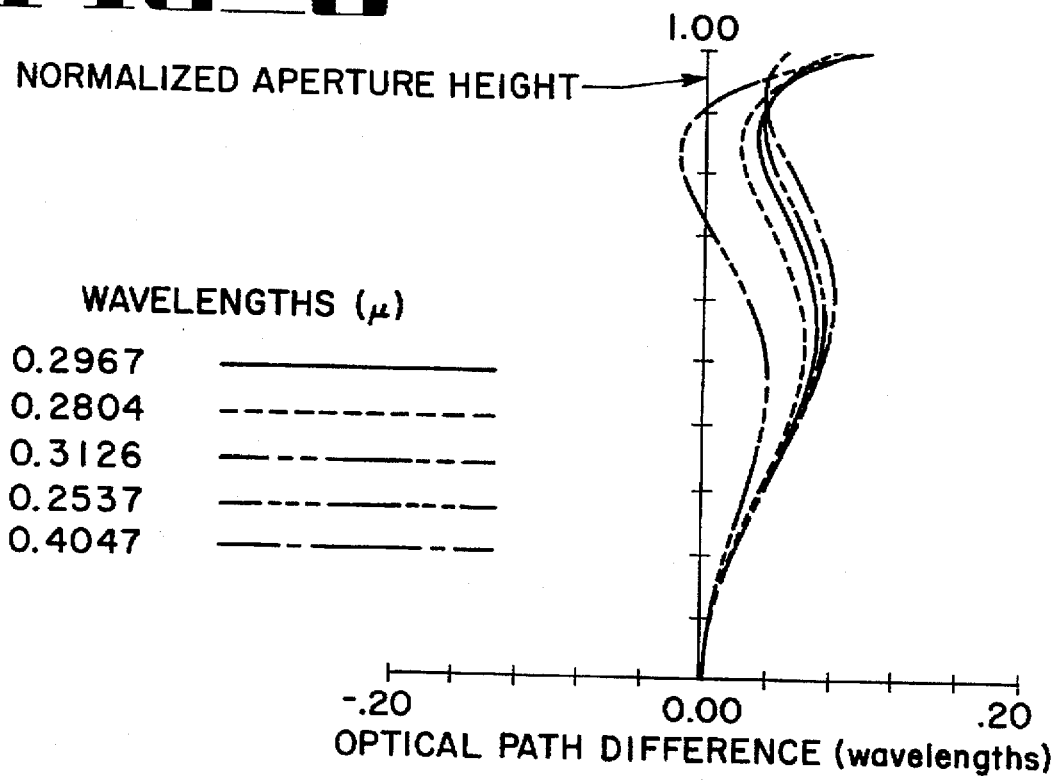
FIG_8

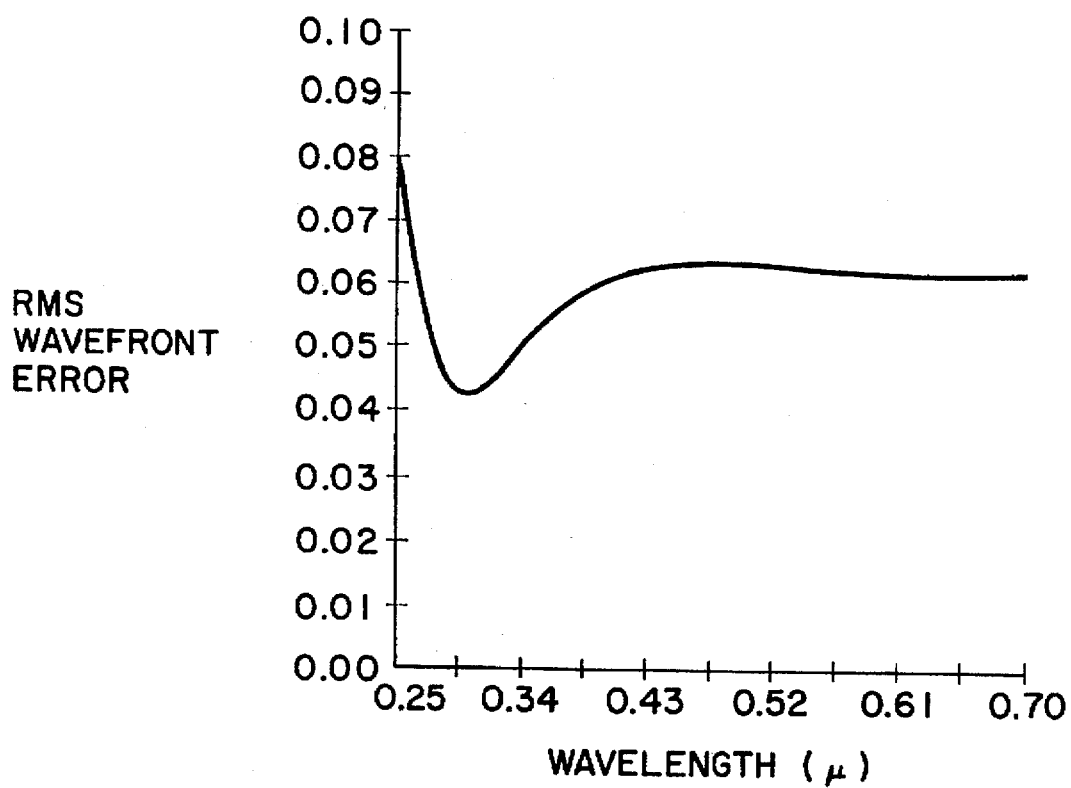
FIG_9
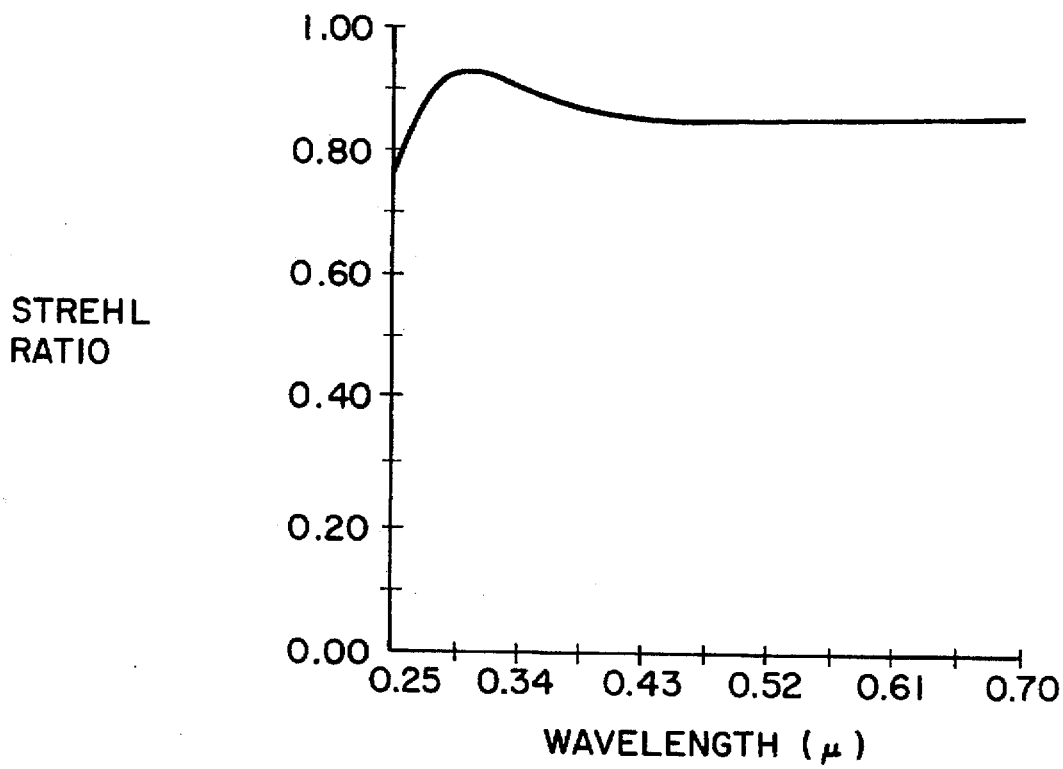
FIG_10

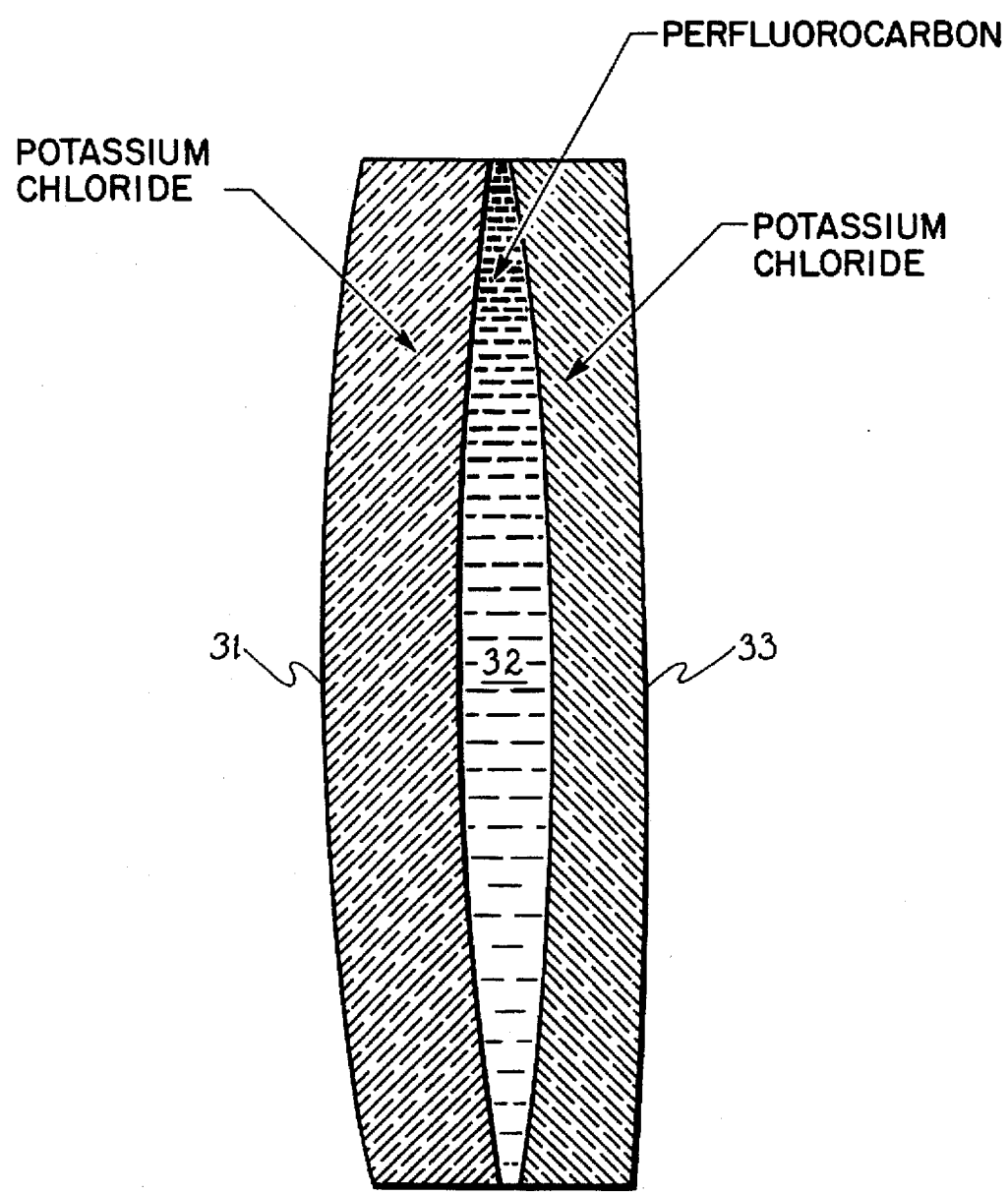
FIG_11

FIG_12
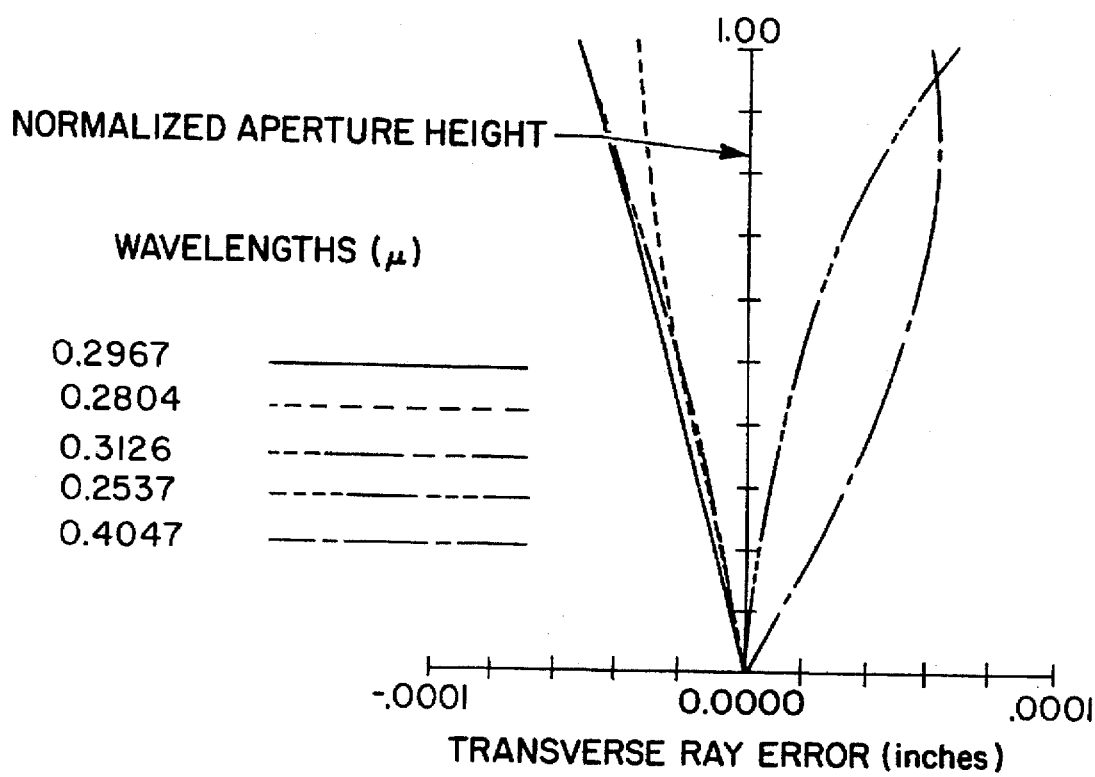
FIG_13
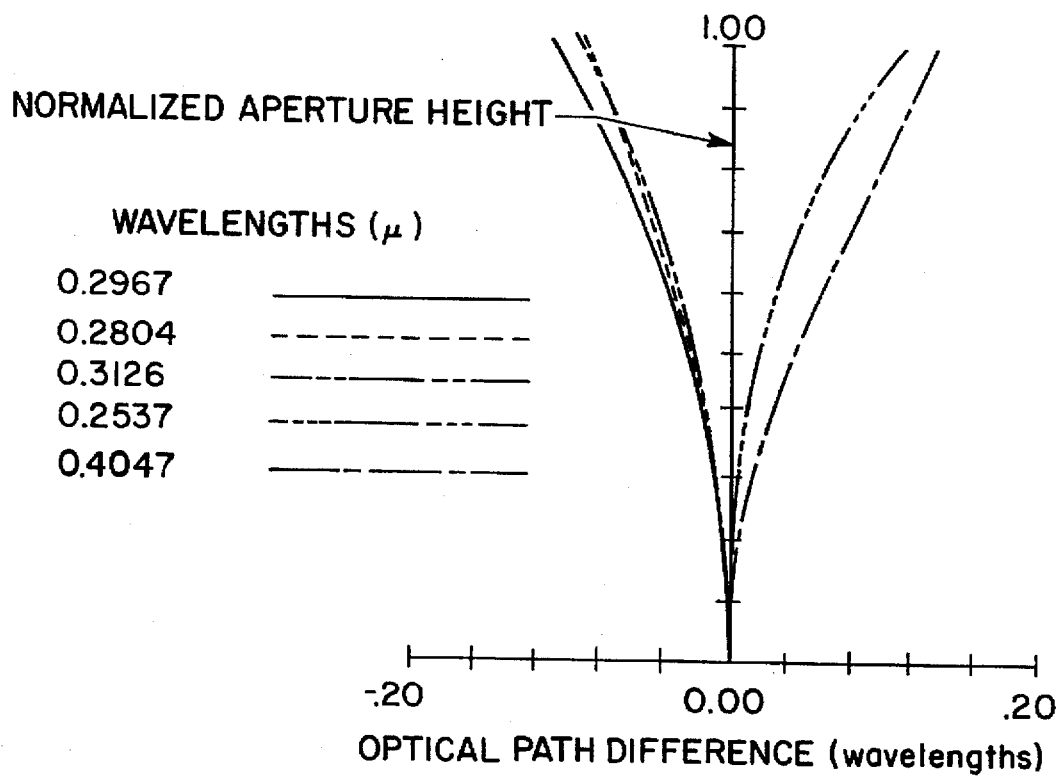

FIG_14
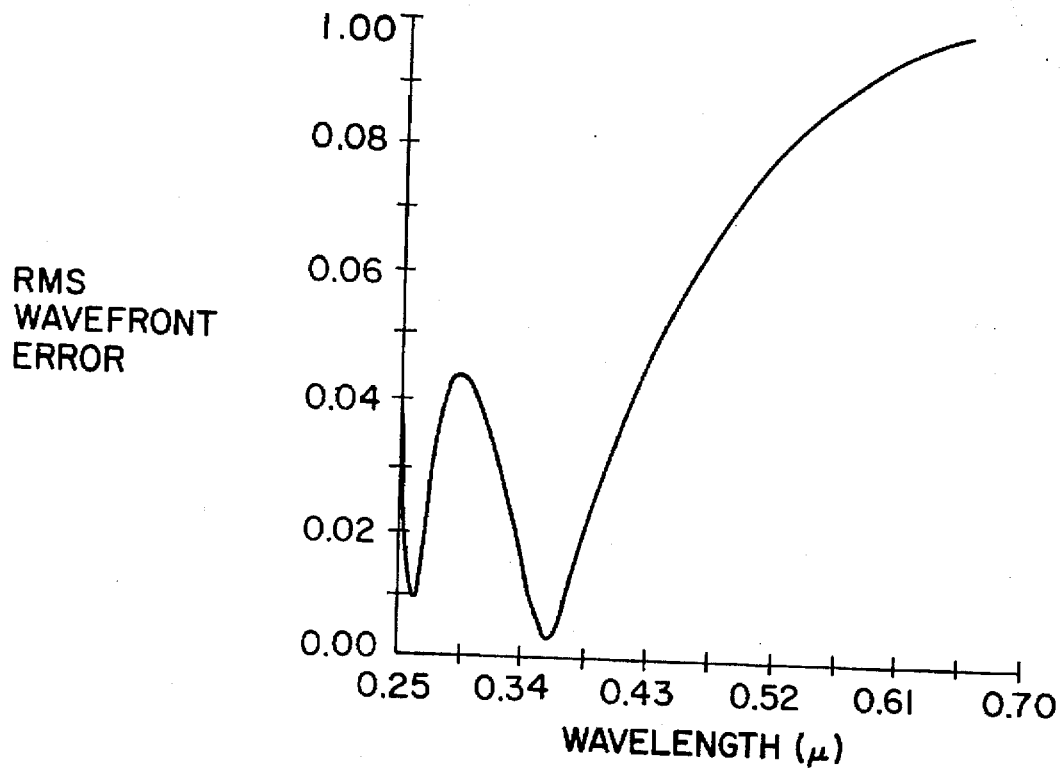
FIG_15
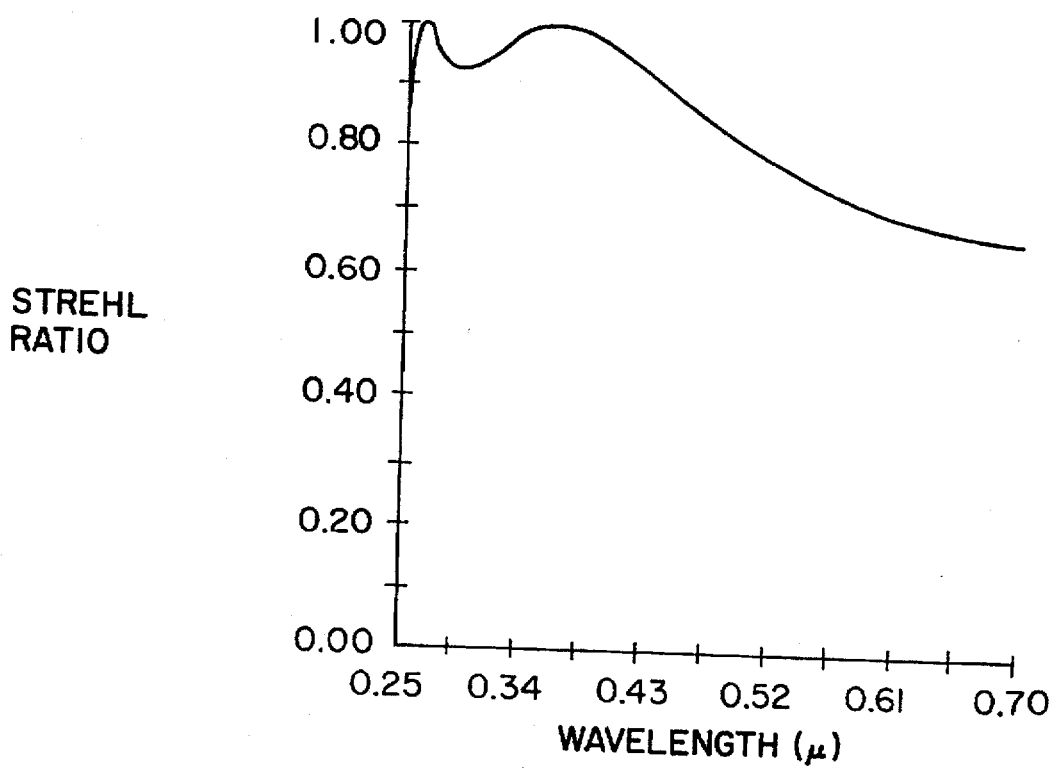

FIG_16
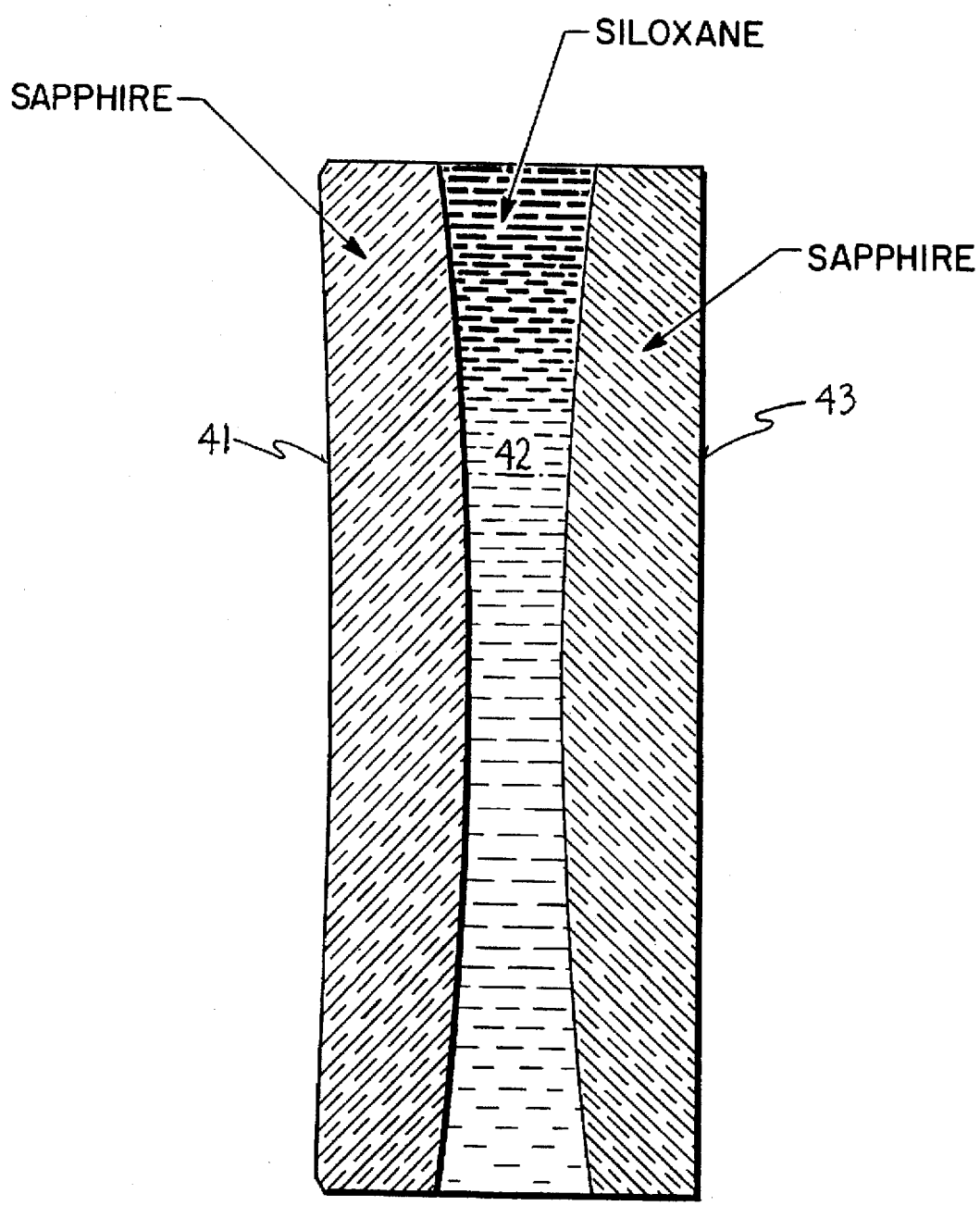

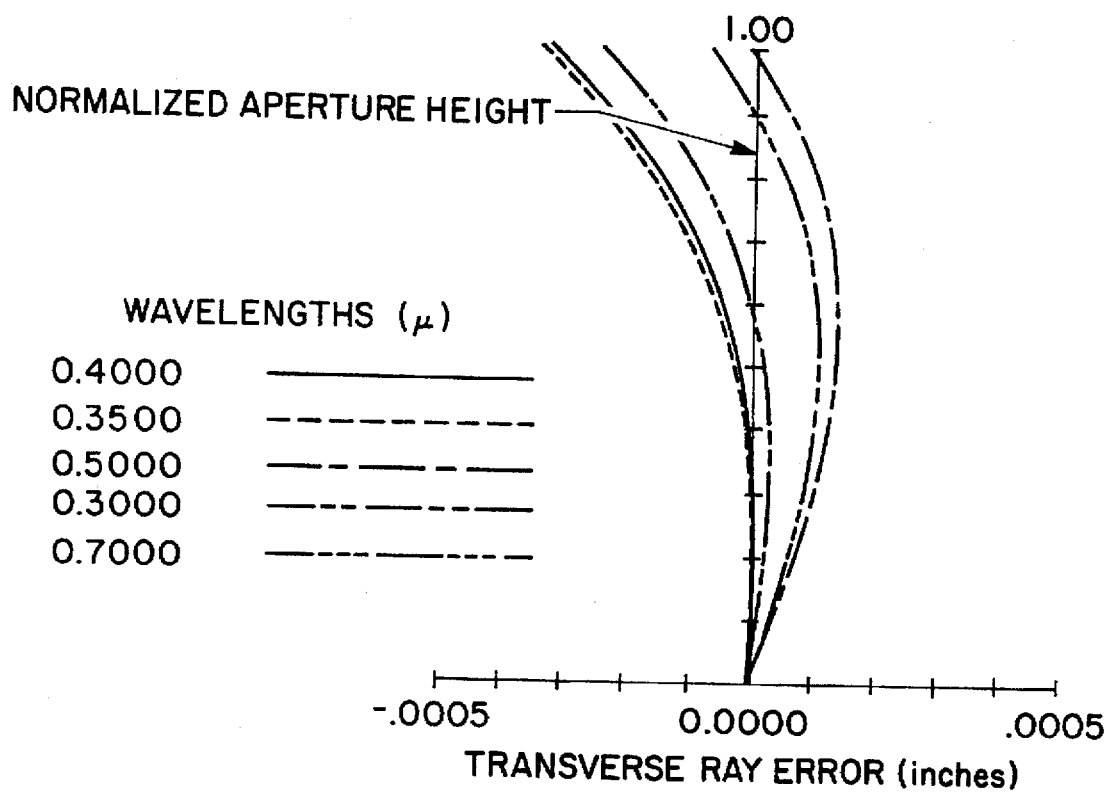
FIG_17
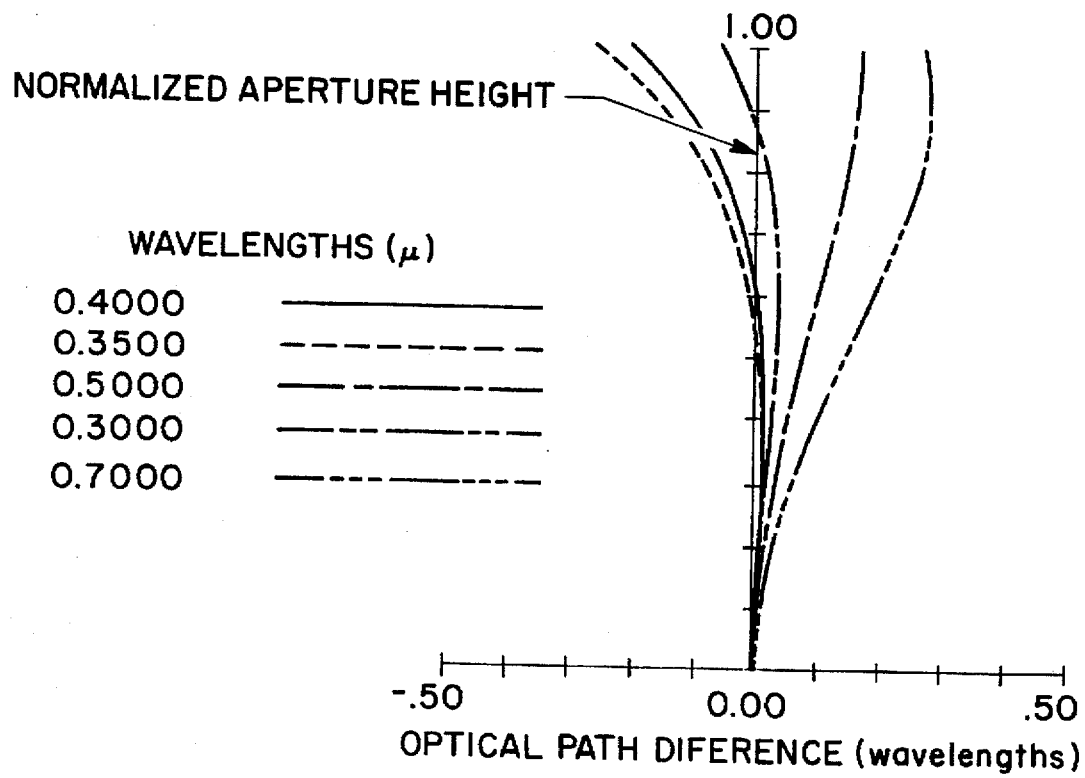
FIG_18

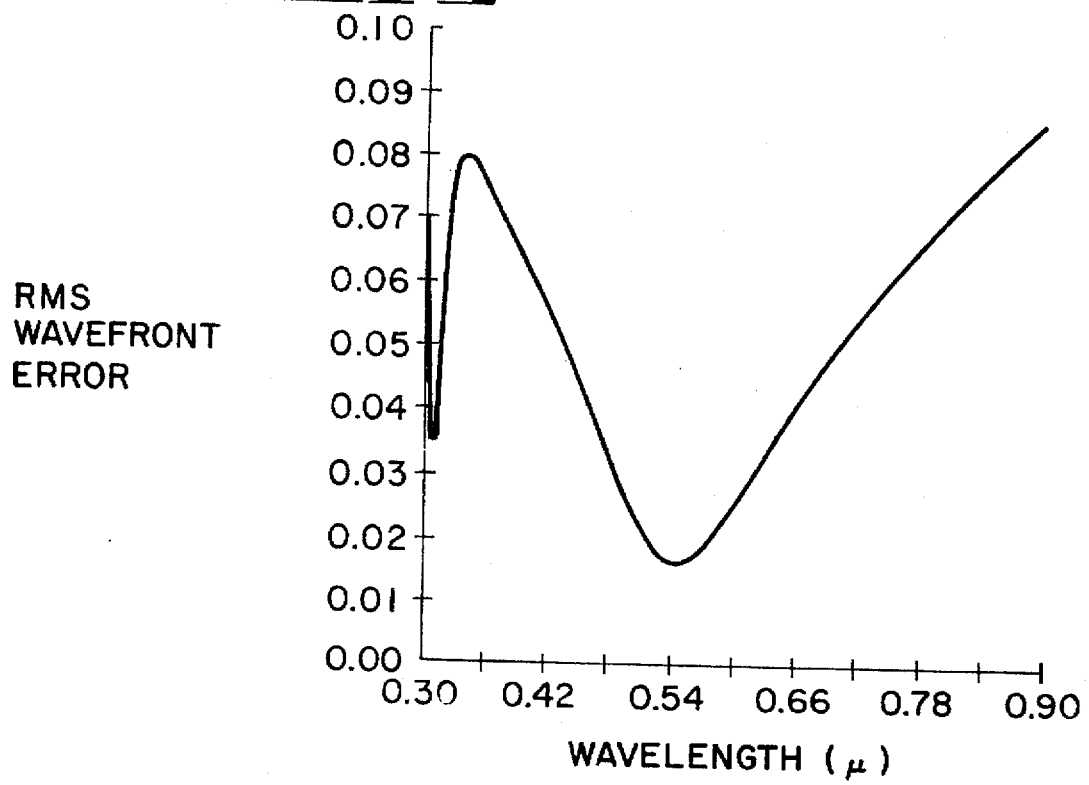
FIG_19
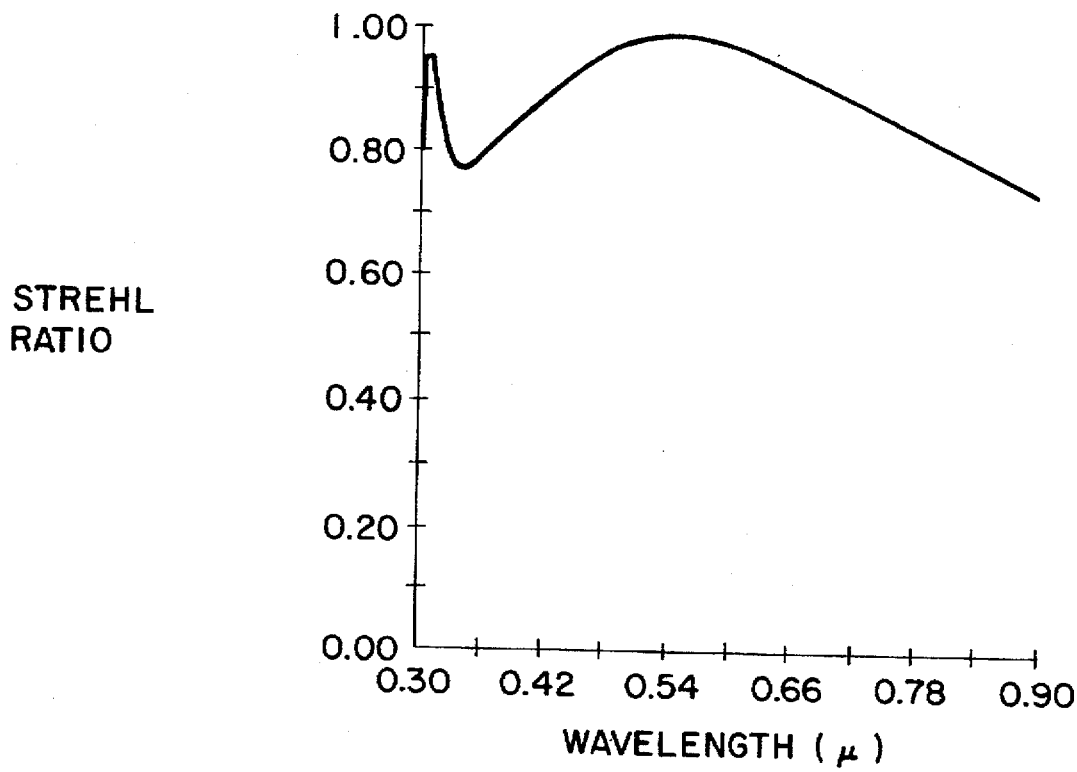
FIG_20

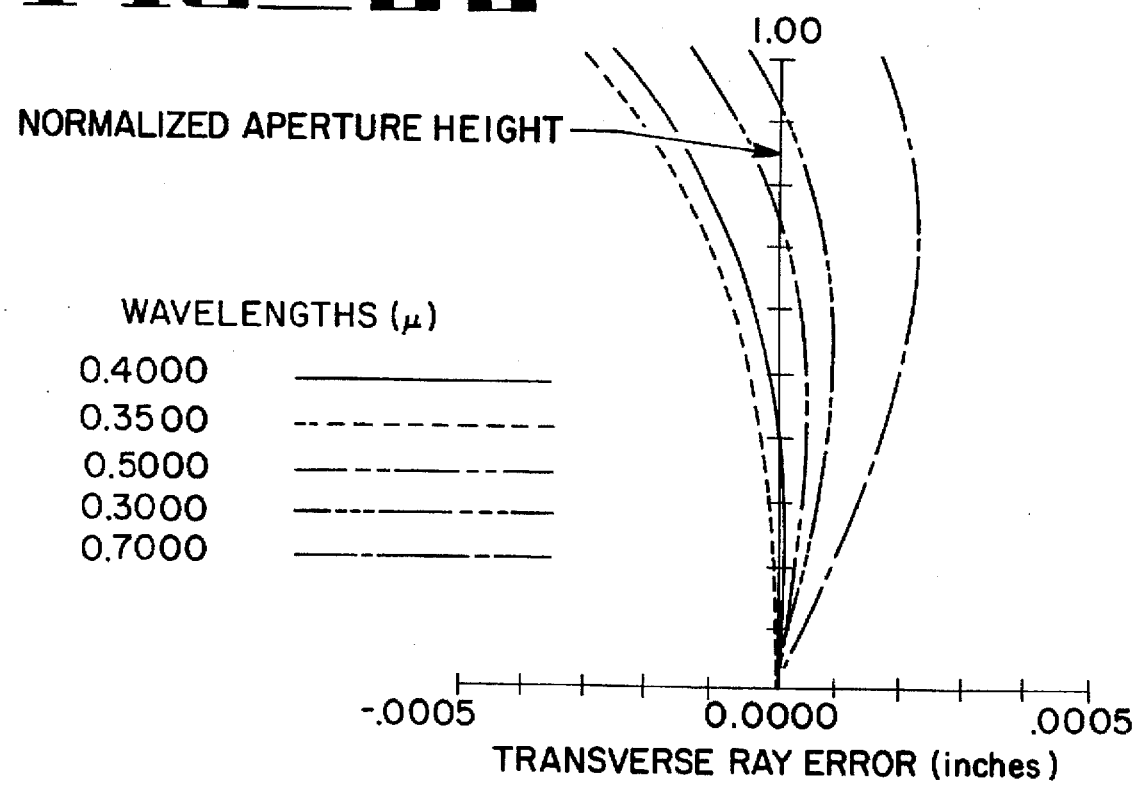
FIG_22
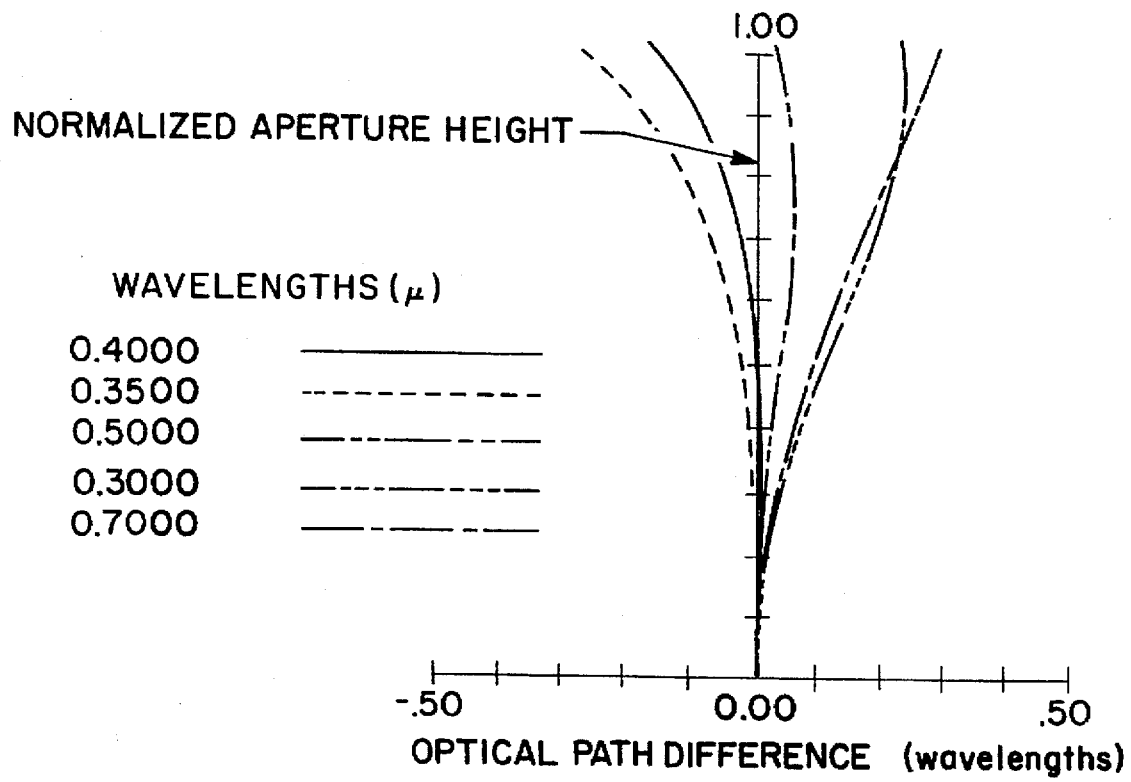
FIG_23

FIG_24
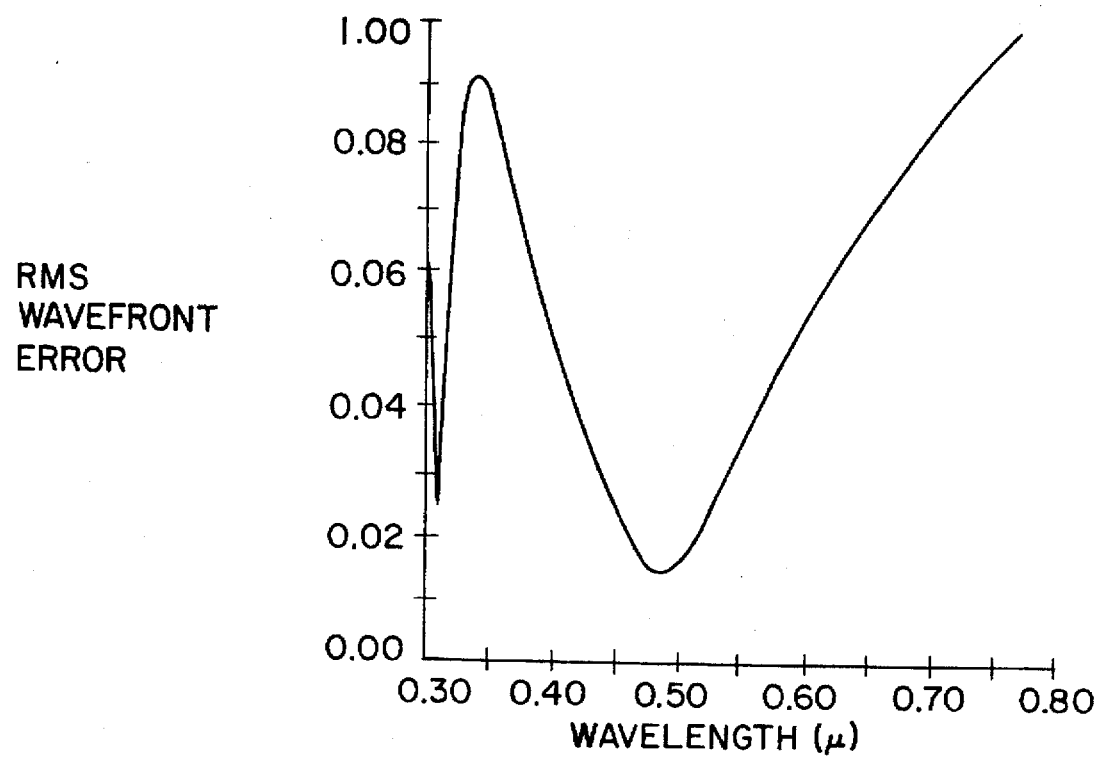
FIG_25
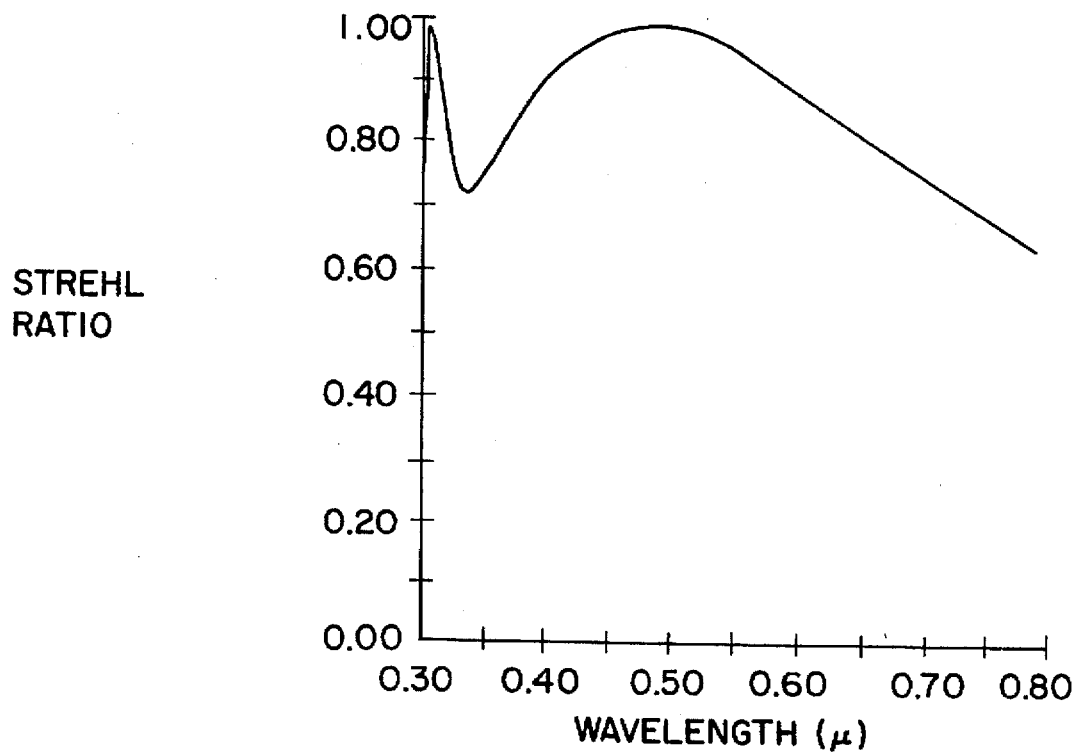

FIG_26
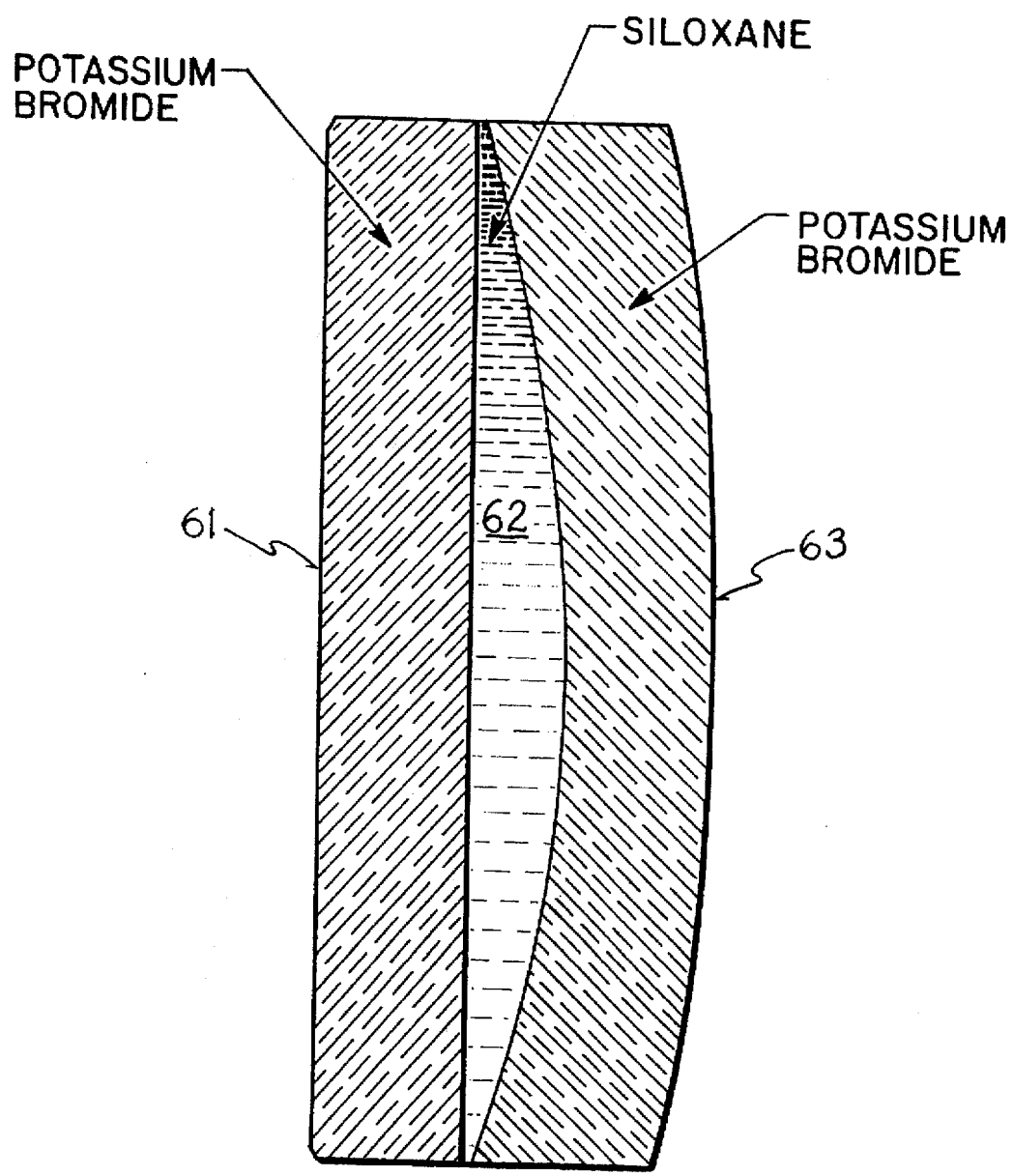

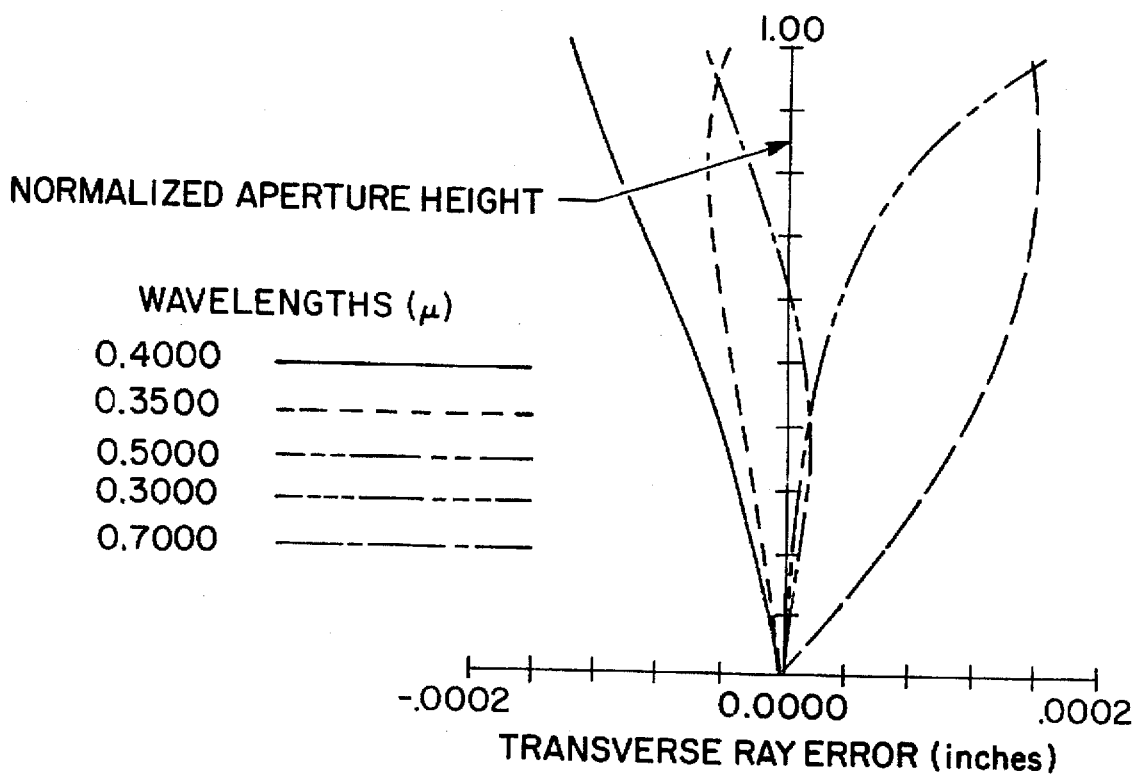
FIG_27
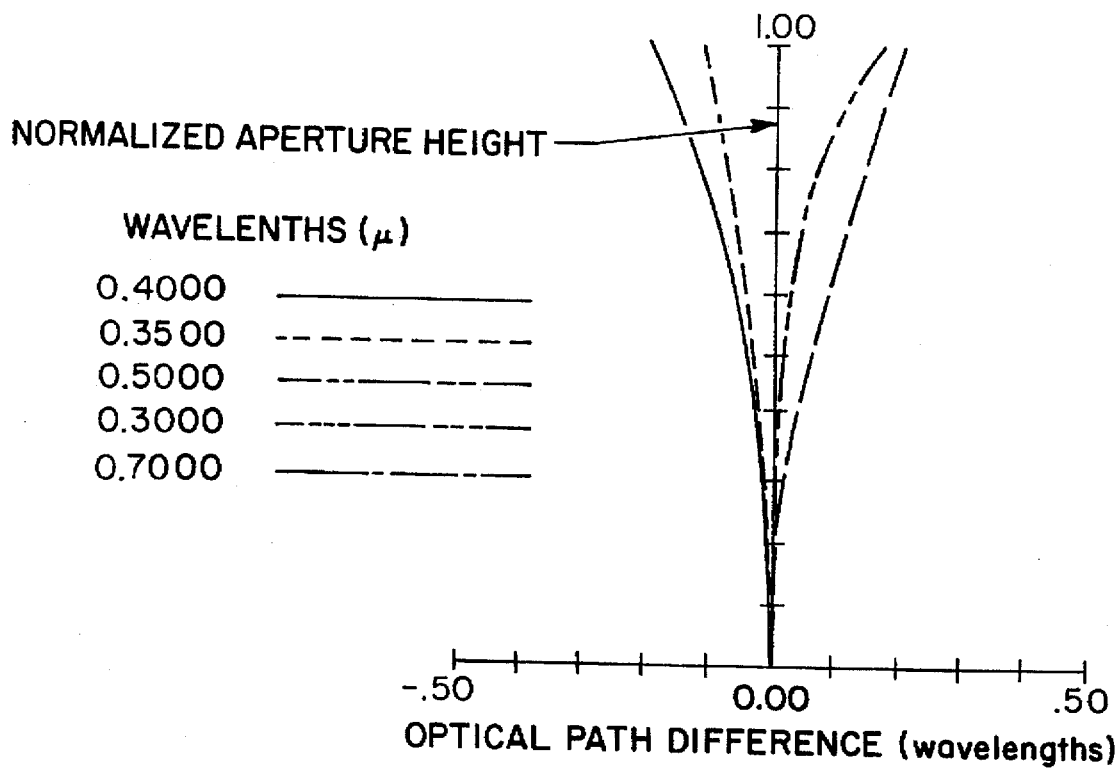
FIG_28

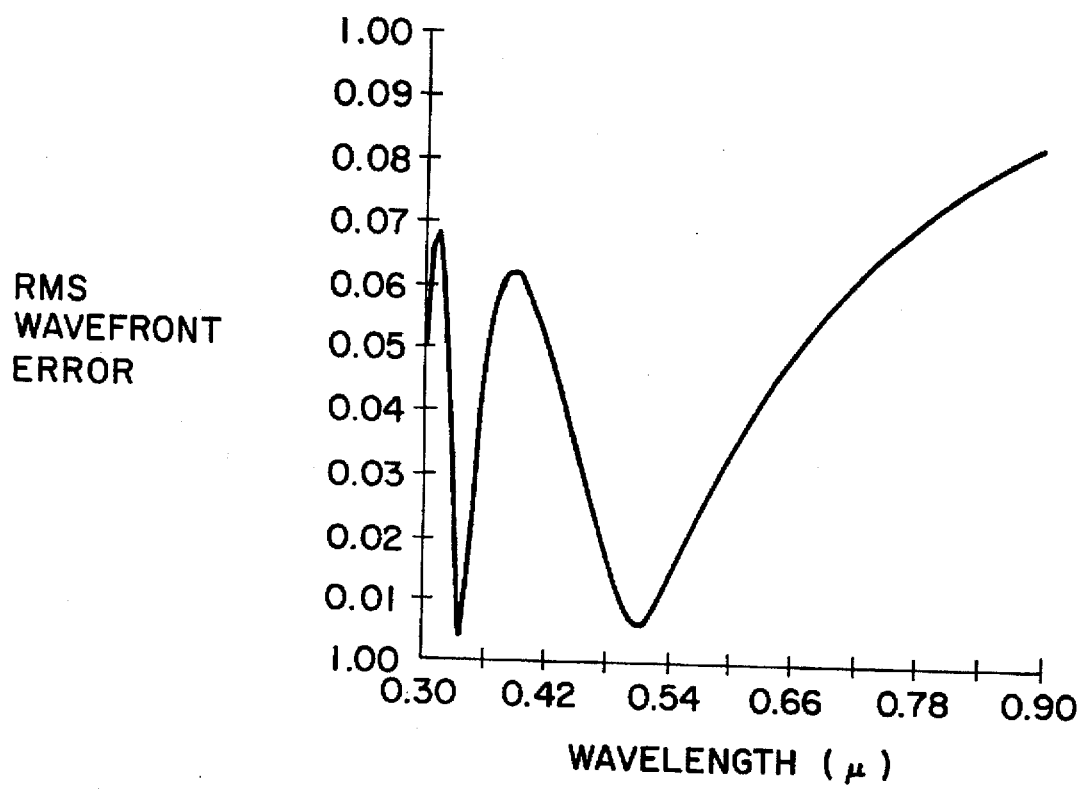
FIG_29
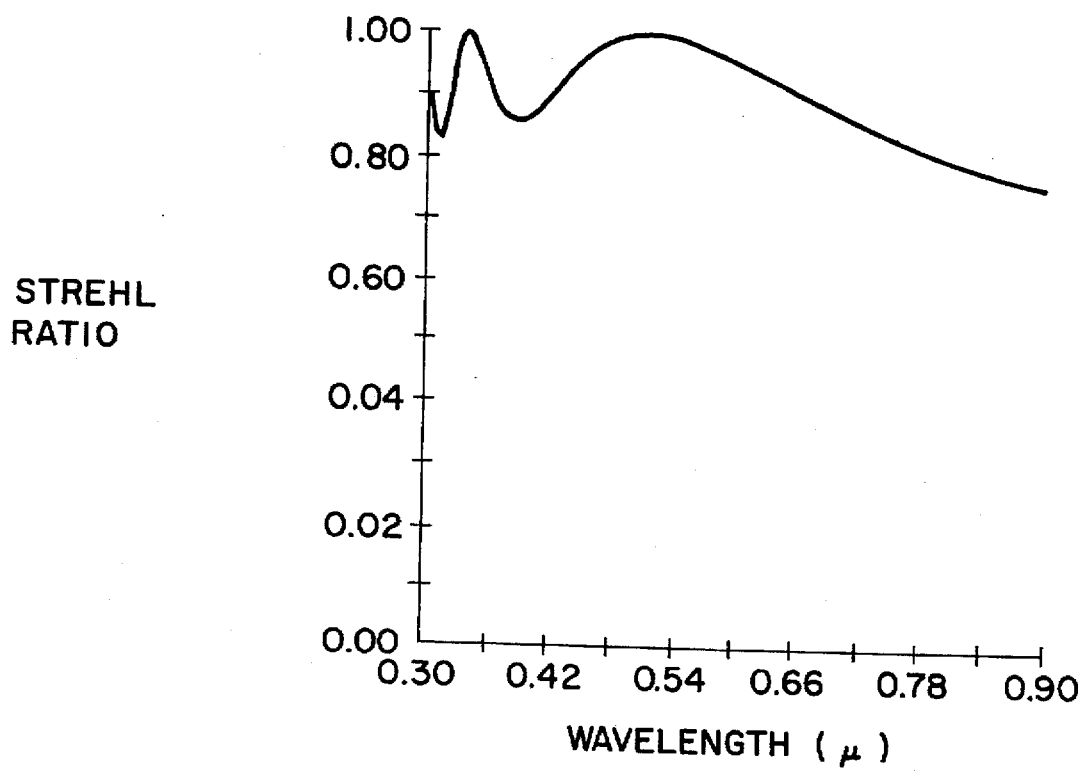
FIG_30

BROAD-BAND ULTRAVIOLET LENS SYSTEMS WELL-CORRECTED FOR CHROMATIC ABERRATION

TECHNICAL FIELD

This invention relates generally to optical systems that are well-corrected for chromatic aberration, and more particularly to lens systems corrected for chromatic aberration that exhibit substantially diffraction-limited performance over a continuous wavelength band from the ultraviolet through the visible to the near infrared regions of the electromagnetic spectrum.

BACKGROUND ART

In order to design an optical system so as to have a specified degree of correction for chromatic aberration, it is necessary to use an appropriate combination of optical materials for the refractive elements of the system. A technique is described in U.S. Pat. No. 5,020,889 for identifying appropriate combinations of optical materials to use in designing optical systems that are to have a specified degree of color correction.

Techniques are described in U.S. Pat. Nos. 4,958,919 and 5,033,831 for selecting combinations of liquids and glasses for use as the lens elements of optical systems that are to be well-corrected for chromatic aberration.

Unless an appropriate combination of optical materials is used for the refractive elements of an optical system, it would not be possible to achieve a specified degree of correction for chromatic aberration for the system. However, the selection of an appropriate combination of optical materials is not a sufficient condition for achieving the specified degree of correction for chromatic aberration. In addition to using an appropriate combination of optical materials, the designer must also determine an appropriate design form for the system—i.e., an appropriate set of geometrical relationships for the refractive elements that comprise the system.

Until recently, techniques as described in the above-cited references for selecting appropriate combinations of optical materials for use in designing optical systems that are corrected for chromatic aberration over specified wavelength ranges had generally not been applied to the ultraviolet wavelength band, because reliable refractive index data in the ultraviolet wavelength band was not available for most optical materials. In particular, there has been practically a complete absence of refractive index measurements at ultraviolet wavelengths for optically useful liquids.

Recent collaboration between researchers at the Lockheed Palo Alto Research Laboratories in Palo Alto, Calif. and the Vavilov State Optical Institute in Saint Petersburg, Russia has resulted in the measurement of refractive indices for a number of liquids at ultraviolet wavelengths, and in the use of such liquids to design optical systems that are well-corrected for chromatic aberration over a broad wavelength band in the ultraviolet region through the visible region into the near infrared region of the electromagnetic spectrum.

SUMMARY OF THE INVENTION

It is an object of the present invention to provide design forms for lens systems that are well-corrected for chromatic aberration and substantially diffraction-limited over a broad wavelength band extending from the ultraviolet region through the visible region into the near infrared region of the electromagnetic spectrum.

It is a more specific object of the present invention to provide design forms for lens systems using a liquid lens element to achieve correction for chromatic aberration over a broad wavelength band extending from the ultraviolet region through the visible region into the near infrared region of the electromagnetic spectrum.

The present invention is disclosed herein in terms of a number of exemplary embodiments of lens systems in which specified optical-quality liquids marketed commercially by R. P. Cargille Laboratories Inc. of Cedar Grove, N.J. are used for the liquid lens elements.

DESCRIPTION OF THE DRAWING

FIG. 1 is a profile drawing of a first embodiment of a lens triplet according to the present invention, which comprises a liquid lens element consisting of perfluorocarbon contained between two solid lens elements made of sapphire.

FIG. 2 is a plot of transverse ray error as a function of normalized aperture height at five different ultraviolet wavelengths for the lens triplet of FIG. 1.

FIG. 3 is a plot of optical path difference as a function of normalized aperture height at the same five different ultraviolet wavelengths as specified in FIG. 2 for the lens triplet of FIG. 1.

FIG. 4 is a plot of root-mean-square (RMS) wavefront error as a function of wavelength over a wavelength band extending from the ultraviolet region through the visible region into the near infrared region of the electromagnetic spectrum for the lens triplet of FIG. 1.

FIG. 5 is a plot of Strehl ratio as a function of wavelength over the same wavelength band as specified in FIG. 4 for the lens triplet of FIG. 1.

FIG. 6 is a profile drawing of a second embodiment of a lens triplet according to the present invention, which comprises a liquid lens element consisting of perfluorocarbon contained between two solid lens elements made of fused silica.

FIG. 7 is a plot of transverse ray error as a function of normalized aperture height at five different ultraviolet wavelengths for the lens triplet of FIG. 6.

FIG. 8 is a plot of optical path difference as a function of normalized aperture height at the same five different ultraviolet wavelengths as specified in FIG. 7 for the lens triplet of FIG. 6.

FIG. 9 is a plot of root-mean-square (RMS) wavefront error as a function of wavelength over a wavelength band extending from the ultraviolet region through the visible region into the near infrared region of the electromagnetic spectrum for the lens triplet of FIG. 6.

FIG. 10 is a plot of Strehl ratio as a function of wavelength over the same wavelength band as specified in FIG. 9 for the lens triplet of FIG. 6.

FIG. 11 is a profile drawing of a third embodiment of a lens triplet according to the present invention, which comprises a liquid lens element consisting of perfluorocarbon contained between two solid lens elements made of potassium chloride.

FIG. 12 is a plot of transverse ray error as a function of normalized aperture height at five different ultraviolet wavelengths for the lens triplet of FIG. 11.

FIG. 13 is a plot of optical path difference as a function of normalized aperture height at the same five different ultraviolet wavelengths as specified in FIG. 12 for the lens triplet of FIG. 11.

FIG. 14 is a plot of root-mean-square (RMS) wavefront error as a function of wavelength over a wavelength band

Figure 21:
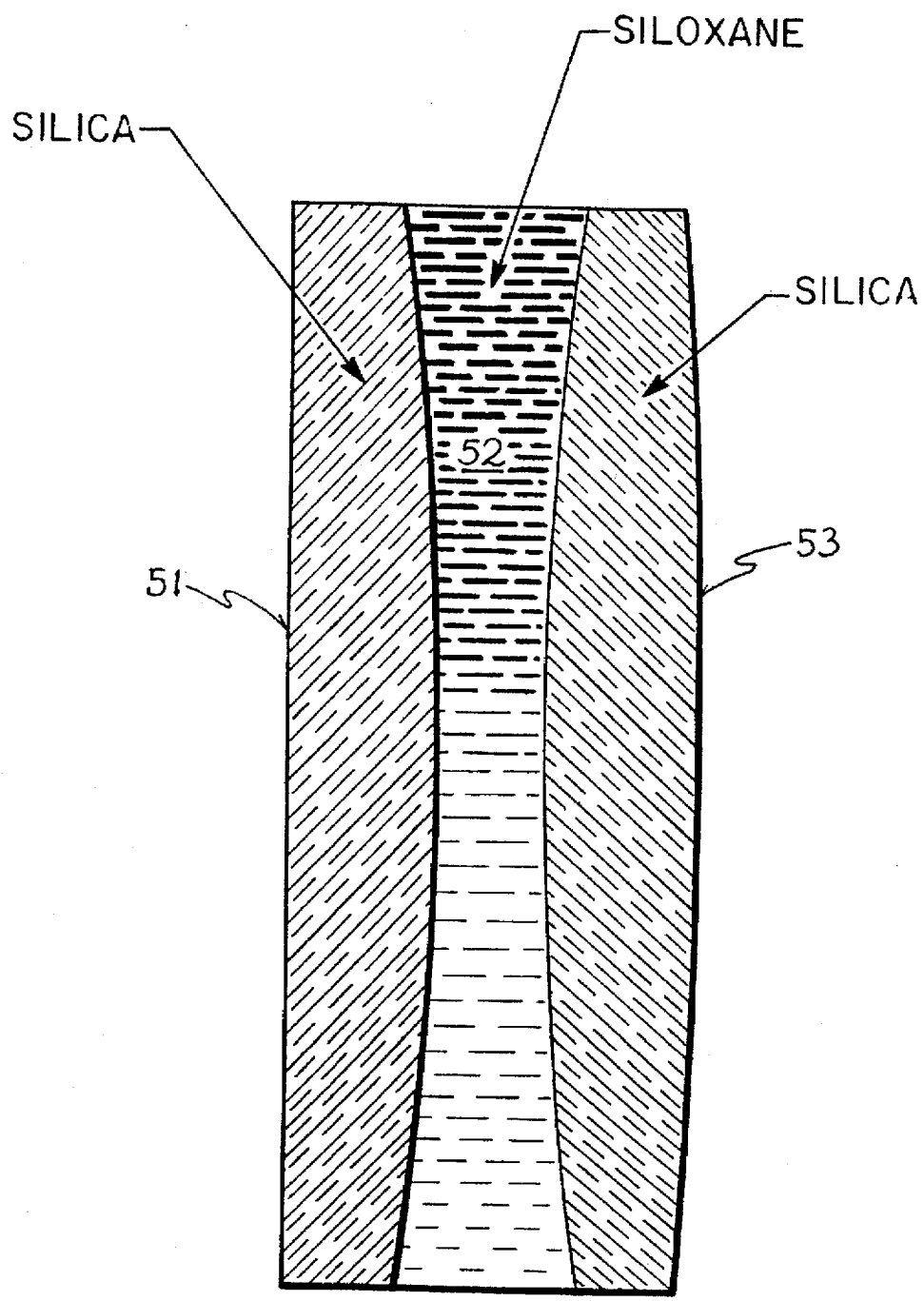

3 extending from the ultraviolet region through the visible region into the near infrared region of the electromagnetic spectrum for the lens triplet of FIG. 11.

FIG. 15 is a plot of Strehl ratio as a function of wavelength over the same wavelength band as specified in FIG. 4 for the lens triplet of FIG. 11.

FIG. 16 is a profile drawing of a fourth embodiment of a lens triplet according to the present invention, which comprises a liquid lens element consisting of siloxane contained between two solid lens elements made of sapphire.

FIG. 17 is a plot of transverse ray error as a function of normalized aperture height at five different ultraviolet wavelengths for the lens triplet of FIG. 16.

FIG. 18 is a plot of optical path difference as a function of normalized aperture height at the same five different ultraviolet wavelengths as specified in FIG. 17 for the lens triplet of FIG. 16.

FIG. 19 is a plot of root-mean-square (RMS) wavefront error as a function of wavelength over a wavelength band extending from the ultraviolet region through the visible region into the near infrared region of the electromagnetic spectrum for the lens triplet of FIG. 16.

FIG. 20 is a plot of Strehl ratio as a function of wavelength over the same wavelength band as specified in FIG. 19 for the lens triplet of FIG. 16.

FIG. 21 is a profile drawing of a fifth embodiment of a lens triplet according to the present invention, which comprises a liquid lens element consisting of siloxane contained between two solid lens elements made of fused silica.

FIG. 22 is a plot of transverse ray error as a function of normalized aperture height at five different ultraviolet wavelengths for the lens triplet of FIG. 21.

FIG. 23 is a plot of optical path difference as a function of normalized aperture height at the same five different ultraviolet wavelengths as specified in FIG. 22 for the lens triplet of FIG. 21.

FIG. 24 is a plot of root-mean-square (RMS) wavefront error as a function of wavelength over a wavelength band extending from the ultraviolet region through the visible region into the near infrared region of the electromagnetic spectrum for the lens triplet of FIG. 21.

FIG. 25 is a plot of Strehl ratio as a function of wavelength over the same wavelength band as specified in FIG. 24 for the lens triplet of FIG. 21.

FIG. 26 is a profile drawing of a sixth embodiment of a lens triplet according to the present invention, which comprises a liquid lens element consisting of siloxane contained between two solid lens elements made of potassium bromide.

FIG. 27 is a plot of transverse ray error as a function of normalized aperture height at five different ultraviolet wavelengths for the lens triplet of FIG. 26.

FIG. 28 is a plot of optical path difference as a function of normalized aperture height at the same five different ultraviolet wavelengths as specified in FIG. 27 for the lens triplet of FIG. 26.

FIG. 29 is a plot of root-mean-square (RMS) wavefront error as a function of wavelength over a wavelength band extending from the ultraviolet region through the visible region into the near infrared region of the electromagnetic spectrum for the lens triplet of FIG. 26.

FIG. 30 is a plot of Strehl ratio as a function of wavelength over the same wavelength band as specified in FIG. 4 for the lens triplet of FIG. 26.

4

BEST MODE OF CARRYING OUT THE INVENTION

First Embodiment

In FIG. 1, a first embodiment of a lens triplet according to the present invention is illustrated in which a first sapphire lens element 11 forms one side of a container for a liquid lens element 12, and a second sapphire lens element 13 forms another side of the container for the liquid lens element 12. The sapphire lens elements 11 and 13 are coaxially disposed along an optic axis, and are mounted so as to contain the liquid lens element 12 therebetween. A technique for mounting a pair of solid lens elements so as to contain a liquid lens element therebetween is disclosed in co-pending U.S. patent application Ser. No. 08/014,596 filed on Feb. 8, 1993, now U.S. Pat. No. 5,446,591.

The sapphire lens elements 11 and 13 can be obtained from, e.g., Solon Technologies Inc. of Solon, Ohio. The liquid lens element 12 consists of perfluorocarbon, which is supplied by R. P. Cargille Laboratories, Inc. of Cedar Grove, N.J. In accordance with the U.S. Mil Spec system for identifying optical materials, perfluorocarbon is identified by the code designation "295990", which indicates an index of refraction of 1.295 (to the third decimal place) and an Abbe number of 99.0 (to the first decimal place) at the wavelength of the sodium d spectral line—i.e., at 0.5893 micron.

The lens triplet shown in FIG. 1 has an optical prescription (i.e., a design form) specified in tabular format as follows:

TABLE I

| Surface No. | Radius (inches) | Thickness (inches) | $N_d$ | $V_d$ | Material |
|---|---|---|---|---|---|
| 1 | 0.8172 | 0.0148 | 1.768239 | 72.01 | Sapphire |
| 2 | 0.2509 | 0.0250 | 1.296386 | 100.98 | 295990 |
| 3 | −0.0840 | 0.0148 | 1.768239 | 72.01 | Sapphire |
| 4 | −0.1077 | 1.0594 | | | Air | where the surfaces of the lens elements are numbered consecutively from left to right along the optic axis in accordance with optical design convention. Thus, surface No. 1 is the left surface of the first sapphire lens element 11. Surface No. 2 is both the right surface of the first sapphire lens element 11 and the left surface of the liquid perfluorocarbon lens element 12. Surface No. 3 is both the right surface of the perfluorocarbon lens element 12, and the left surface of the second sapphire lens element 13. The aperture stop is at surface No. 1.

The radius listed for each lens surface in Table I is the radius of curvature expressed in inches. In accordance with convention, the radius of curvature is positive if the center of curvature of the surface lies to the right of the surface, and negative if the center of curvature of the surface lies to the left of the surface. The thickness listed for each lens surface is the thickness expressed in inches of the lens element bounded on the left by the surface. The thickness of each lens element is measured along the optic axis.

The column headed $N_d$ in Table I refers to the index of refraction of the lens element bounded on the left by the indicated surface at the wavelength of the sodium d spectral line (i.e., 0.58756 micron). The column headed $V_d$ refers to the Abbe number for the lens element bounded on the left by the indicated surface. The material listed for each surface in Table I refers to the type of material bounded on the left by that surface.

The index of refraction of an optical material varies with wavelength. The indices of refraction for the two different materials comprising the lens elements 11, 12 and 13 of the lens triplet of FIG. 1 at five representative ultraviolet wavelengths in the range from 0.25 micron to 0.45 micron (i.e., $N_1$ at 0.29673 micron; $N_2$ at 0.28035 micron; $N_3$ at 0.31257 micron; $N_4$ at 0.25365 micron; and $N_5$ at 0.40466 micron) are tabulated as follows:

TABLE II

| Material | $N_1$ | $N_2$ | $N_3$ | $N_4$ | $N_5$ |
|---|---|---|---|---|---|
| Sapphire | 1.815938 | 1.824273 | 1.809249 | 1.841966 | 1.785813 |
| 295990 | 1.309614 | 1.311931 | 1.307761 | 1.316952 | 1.301262 |

It is instructive to evaluate the performance of the lens triplet of FIG. 1 at each of the above-specified ultraviolet wavelengths. A graphical indication of performance of a lens system at a particular wavelength is provided by a plot of transverse ray error as a function of normalized aperture height for the particular wavelength. In FIG. 2, plots of transverse ray error as a function of normalized aperture height are shown for the lens triplet of FIG. 1 for each of the five ultraviolet wavelengths for which indices of refraction are listed in Table II. The curves in FIG. 2 are extremely close to each other at all points on the aperture, which indicates that the lens triplet of FIG. 1 exhibits substantially uniform performance throughout the ultraviolet wavelength range from 0.25365 micron to 0.40466 micron.

Another graphical indication of performance of a lens system at a specified wavelength is provided by a plot of optical path difference as a function of normalized aperture height for the specified wavelength. In FIG. 3, plots of optical path difference as a function of normalized aperture height are shown for the lens triplet of FIG. 1 for each of the same five ultraviolet wavelengths for which indices of refraction are listed in Table II. It can be determined from the curves in FIG. 3 that the maximum optical path difference for the lens triplet of FIG. 1 throughout the wavelength range from 0.25365 micron to 0.40466 micron is less than $\lambda/5.2$ (i.e., 1/5.2 of a wavelength) at any point on the aperture.

In FIG. 4, the root-mean-square (RMS) wavefront error of the lens triplet of FIG. 1 is plotted as a function of wavelength throughout the ultraviolet and visible portions Of the electromagnetic spectrum from 0.25 micron to 0.70 micron. It is apparent from FIG. 4 that the lens triplet of FIG. 1 is well-corrected for chromatic aberration over a broad wavelength band extending from well into the ultraviolet region through the visible region to the near infrared region of the spectrum.

The lens triplet of FIG. 1 has been designed particularly for use at ultraviolet wavelengths. However, it is a noteworthy advantage of the lens triplet of FIG. 1 that a wide band of visible wavelengths can be focused practically precisely on the same focal plane as a wide band of ultraviolet wavelengths, thereby greatly facilitating alignment and calibration of any optical system in which the lens triplet is used. Indices of refraction in the visible region of the electromagnetic spectrum for the materials comprising the lens elements 11, 12 and 13 of the lens triplet of FIG. 1 at five representative wavelengths (i.e., $N_6$ at 0.58756 micron; $N_7$ at 0.48613 micron; $N_8$ at 0.65627 micron; $N_9$ at 0.43584 micron; and $N_{10}$ at 0.70652 micron) are tabulated as follows:

TABLE III

| Material | $N_6$ | $N_7$ | $N_8$ | $N_9$ | $N_{10}$ |
|---|---|---|---|---|---|
| Sapphire | 1.768239 | 1.775605 | 1.764936 | 1.781224 | 1.763022 |
| 295990 | 1.296386 | 1.298419 | 1.295483 | 1.299981 | 1.294966 |

From plots of transverse ray error as a function of normalized aperture height at the ten different wavelengths for which indices of refraction are listed in Tables II and III, and at additional wavelengths in the near infrared region, it has been established that the lens triplet of FIG. 1 has a maximum wavefront error of $\lambda/5.2$ at any point on the aperture throughout the wavelength range from 0.27 micron to 0.90 micron. The lens triplet of FIG. 1 has a maximum RMS wavefront error of only $\lambda/22.2$ and an average RMS wavefront error of only $\lambda/31.4$ over the wavelength range from 0.27 micron to 0.90 micron.

A numerical measure that is widely used in the optical industry to quantitatively describe the performance of a nearly diffraction-limited lens system is the Strehl ratio, which is defined as the ratio of the intensity in the diffraction point spread function of the lens system being described to the intensity in the diffraction point spread function of a perfect (i.e., aberration-free) lens system. In FIG. 5, the Strehl ratio for the lens triplet of FIG. 1 is plotted as a function of wavelength throughout the ultraviolet and visible portions of the electromagnetic spectrum from 0.25 micron to 0.70 micron. It is apparent from FIG. 5 that the Strehl ratio for the lens triplet of FIG. 1 is virtually unchanged throughout a wavelength range extending from deep in the ultraviolet region (i.e., less than 0.34 micron) to well into the near infrared region (i.e., greater than 0.7 micron).

Second Embodiment

In FIG. 6, a second embodiment of a lens triplet according to the present invention is illustrated in which a first fused silica lens element 21 forms one side of a container for a liquid lens element 22, and a second fused silica lens element 23 forms another side of the container for the liquid lens element 22. The fused silica lens elements 21 and 23 are coaxially disposed along an optic axis, and are mounted so as to contain the liquid lens element 22 therebetween. The fused silica lens elements 21 and 23 can be obtained from, e.g., Heraeus Amersil, Inc. of Duluth, Ga. The liquid lens element 22 consists of perfluorocarbon, which is identified by the code designation "295990" in the U.S. Mil Spec system for identifying optical materials.

The lens triplet shown in FIG. 6 has an optical prescription specified in tabular format as follows:

TABLE IV

| Surface No. | Radius (inches) | Thickness (inches) | $N_d$ | $V_d$ | Material |
|---|---|---|---|---|---|
| 1 | −0.6614 | 0.0148 | 1.458464 | 67.82 | Fused Silica |
| 2 | 3.9902 | 0.0185 | 1.296386 | 100.98 | 295990 |
| 3 | −0.0917 | 0.0148 | 1.458464 | 67.82 | Fused Silica |
| 4 | −0.1355 | 1.0363 | | | Air | where the surfaces of the lens elements are numbered consecutively from left to right along the optic axis in accordance with the same optical design convention as described above in connection with the embodiment illustrated in FIG. 1. The aperture stop is at surface No. 1.

The indices of refraction for the materials comprising the lens elements 21, 22 and 23 of the lens triplet of FIG. 6 at the same five representative ultraviolet wavelengths for which indices of refraction are listed in Table II are tabulated as follows:

TABLE V

| Material | $N_1$ | $N_2$ | $N_3$ | $N_4$ | $N_5$ |
| --- | --- | --- | --- | --- | --- |
| Fused Silica | 1.488727 | 1.494032 | 1.484484 | 1.505516 | 1.469619 |
| 295990 | 1.309614 | 1.311931 | 1.307761 | 1.316952 | 1.301262 |

In FIG. 7, plots of transverse ray error as a function of normalized aperture height are shown for the lens triplet of FIG. 6 for each of the same five ultraviolet wavelengths for which indices of refraction are listed in Tables II and V. The curves in FIG. 7 are extremely close to each other at all points on the aperture, which indicates that the lens triplet of FIG. 6 exhibits substantially uniform performance throughout the ultraviolet wavelength range from 0.25365 micron to 0.40466 micron.

In FIG. 8, plots of optical path difference as a function of normalized aperture height are shown for the lens triplet of FIG. 6 for each of same the five ultraviolet wavelengths for which indices of refraction are listed in Table II and V. It can be determined from the curves in FIG. 8 that the maximum optical path difference for the lens triplet of FIG. 6 throughout the wavelength range from 0.25365 micron to 0.40466 micron is less than $\lambda/10.0$ at any point on the aperture.

In FIG. 9, the root-mean-square (RMS) wavefront error of the lens triplet of FIG. 6 is plotted as a function of wavelength throughout the ultraviolet and visible portions of the electromagnetic spectrum from 0.25 micron to 0.70 micron. It is apparent from FIG. 9 that the lens triplet of FIG. 6 is well-corrected for chromatic aberration over a broad wavelength band extending from well into the ultraviolet region through the visible region to the near infrared region of the spectrum.

Indices of refraction in the visible region of the electromagnetic spectrum for the materials comprising the lens elements 21, 22 and 23 of the lens triplet of FIG. 6 at the same five representative visible wavelengths as listed above for Table III are tabulated as follows:

TABLE VI

| Material | $N_6$ | $N_7$ | $N_8$ | $N_9$ | $N_{10}$ |
| --- | --- | --- | --- | --- | --- |
| Fused Silica | 1.458464 | 1.463127 | 1.456367 | 1.466692 | 1.455146 |
| 295990 | 1.296386 | 1.298419 | 1.295483 | 1.299981 | 1.294966 |

From plots of transverse ray error as a function of normalized aperture height at the ten different wavelengths for which indices of refraction are listed in Tables V and VI, and at additional wavelengths in the near infrared region, it has been established that the lens triplet of FIG. 6 has a maximum wavefront error of $\lambda/10.0$ at any point on the aperture throughout the wavelength range from 0.25 micron to 0.90 micron. The lens triplet of FIG. 6 has a maximum RMS wavefront error of only $\lambda/37.2$ and an average RMS wavefront error of only $\lambda/50.2$ over the wavelength range from 0.27 micron to 0.90 micron.

In FIG. 10, the Strehl ratio for the lens triplet of FIG. 6 is plotted as a function of wavelength throughout the ultraviolet and visible portions of the electromagnetic spectrum from 0.25 micron to 0.70 micron. It is apparent from FIG. 10 that the Strehl ratio for the lens triplet of FIG. 6 is virtually unchanged throughout a wavelength range extending from deep in the ultraviolet region (i.e., less than 0.34 micron) to well into the near infrared region (i.e., greater than 0.7 micron).

Third Embodiment

In FIG. 11, a third embodiment of a lens triplet according to the present invention is illustrated in which a first potassium chloride (KCl) lens element 31 forms one side of a container for a liquid lens element 32, and a second potassium chloride (KCl) lens element 33 forms another side of the container for the liquid lens element 32. The KCl lens elements 31 and 33 are coaxially disposed along an optic axis, and are mounted so as to contain the liquid lens element 32 therebetween. The KCl lens elements 31 and 33 can be obtained from, e.g., Solon Technologies Inc. of Solon, Ohio. The liquid lens element 32 consists of perfluorocarbon, which is identified by the code designation "295990" in the U.S. Mil Spec system for identifying optical materials.

The lens triplet shown in FIG. 11 has an optical prescription specified in tabular format as follows:

TABLE VII

| Surface No. | Radius (inches) | Thickness (inches) | $N_d$ | $V_d$ | Material |
| --- | --- | --- | --- | --- | --- |
| 1 | 0.3648 | 0.0148 | 1.490371 | 44.41 | KCl |
| 2 | 0.4129 | 0.0100 | 1.296386 | 100.98 | 295990 |
| 3 | −0.3582 | 0.0100 | 1.490371 | 44.41 | KCl |
| 4 | −0.7453 | 0.9774 | | | Air | where the surfaces of the lens elements are numbered consecutively from left to right along the optic axis in accordance with the same optical design convention as described above in connection with the embodiment illustrated in FIG. 1. The aperture stop is at surface No. 1.

The indices of refraction for the materials comprising the lens elements 31, 32 and 33 of the lens triplet of FIG. 11 at the same five representative ultraviolet wavelengths for which indices of refraction are listed in Tables II and V are tabulated as follows:

TABLE VIII

| Material | $N_1$ | $N_2$ | $N_3$ | $N_4$ | $N_5$ |
| --- | --- | --- | --- | --- | --- |
| KCl | 1.548046 | 1.559633 | 1.539053 | 1.585981 | 1.509827 |
| 295990 | 1.309614 | 1.311931 | 1.307761 | 1.316952 | 1.301262 |

In FIG. 12, plots of transverse ray error as a function of normalized aperture height for the lens triplet of FIG. 11 are shown for each of the five ultraviolet wavelengths for which indices of refraction are listed in Table VIII. The curves in FIG. 12 are extremely close to each other at all points on the aperture, which indicates that the lens triplet of FIG. 11 exhibits substantially uniform performance throughout the ultraviolet wavelength range from 0.25365 micron to 0.40466 micron.

In FIG. 13, plots of optical path difference as a function of normalized aperture height for the lens triplet of FIG. 11 are shown for each of the five ultraviolet wavelengths listed in Table VIII. It can be determined from the curves in FIG. 13 that the maximum optical path difference for the lens triplet of FIG. 11 throughout the wavelength range from 0.25365 micron to 0.40466 micron is less than $\lambda/7.5$ at any point on the aperture.

In FIG. 14, the root-mean-square (RMS) wavefront error of the lens triplet of FIG. 11 is plotted as a function of wavelength throughout the ultraviolet and visible portions of the electromagnetic spectrum from 0.25 micron to 0.70 micron. It is apparent from FIG. 14 that the lens triplet of FIG. 11 is well-corrected for chromatic aberration over a broad wavelength band extending from well into the ultraviolet region through the visible region to the near infrared region of the spectrum.

Indices of refraction in the visible region of the electromagnetic spectrum for the materials comprising the lens elements 31, 32 and 33 of the lens triplet of FIG. 11 at the same five representative visible wavelengths for which indices of refraction are listed in Tables III and VI are tabulated as follows:

TABLE IX

| Material | $N_6$ | $N_7$ | $N_8$ | $N_9$ | $N_{10}$ |
| --- | --- | --- | --- | --- | --- |
| KCl | 1.490371 | 1.498166 | 1.487123 | 1.504468 | 1.485348 |
| 295990 | 1.296386 | 1.298419 | 1.295483 | 1.299981 | 1.294966 |

From plots of transverse ray error as a function of normalized aperture height at the ten different wavelengths for which indices of refraction are listed in Tables VIII and IX, and at additional wavelengths in the near infrared region, it has been established that the lens triplet of FIG. 11 has a maximum wavefront error of $\lambda/7.5$ at any point on the aperture throughout the wavelength range from 0.25 micron to 0.90 micron. The lens triplet of FIG. 11 has a maximum RMS wavefront error of only $\lambda/9.1$ and an average RMS wavefront error of only $\lambda/12.7$ over the wavelength range from 0.25 micron to 0.90 micron.

In FIG. 15, the Strehl ratio for the lens triplet of FIG. 11 is plotted as a function of wavelength throughout the ultraviolet and visible portions of the electromagnetic spectrum from 0.25 micron to 0.70 micron. It is apparent from FIG. 15 that the Strehl ratio for the lens triplet of FIG. 11 is virtually unchanged throughout a wavelength range extending from deep in the ultraviolet region (i.e., less than 0.34 micron) to well into the near infrared region (i.e., greater than 0.7 micron).

Fourth Embodiment

In FIG. 16, a fourth embodiment of a lens triplet according to the present invention is illustrated in which a first sapphire lens element 41 forms one side of a container for a liquid lens element 42, and a second sapphire lens element 43 forms another side of the container for the liquid lens element 42. The sapphire lens elements 41 and 43 are coaxially disposed along an optic axis, and are mounted so as to contain the liquid lens element 42 therebetween. The liquid lens element 42 consists of siloxane, which is identified by the code designation "400513" in the U.S. Mil Spec system for identifying optical materials.

The lens triplet shown in FIG. 16 has an optical prescription specified in tabular format as follows:

TABLE X

| Surface No. | Radius (inches) | Thickness (inches) | $N_d$ | $V_d$ | Material |
| --- | --- | --- | --- | --- | --- |
| 1 | −1.0024 | 0.0148 | 1.768239 | 72.01 | Sapphire |
| 2 | −0.4342 | 0.0100 | 1.401102 | 51.43 | 400513 |
| 3 | 0.4732 | 0.0148 | 1.768239 | 72.01 | Sapphire |
| 4 | −5.8405 | 0.9975 | | | Air | where the surfaces of the lens elements are numbered consecutively from left to right along the optic axis in accordance with the same optical design convention as described above in connection with the embodiment illustrated in FIG. 1. The aperture stop is at surface No. 1.

The indices of refraction for the materials comprising the lens elements 41, 42 and 43 of the lens triplet of FIG. 16 at the same five representative ultraviolet wavelengths for which indices of refraction are listed in Tables II, V and VIII are tabulated as follows:

TABLE XI

| Material | $N_1$ | $N_2$ | $N_3$ | $N_4$ | $N_5$ |
| --- | --- | --- | --- | --- | --- |
| Sapphire | 1.786604 | 1.797255 | 1.774342 | 1.814489 | 1.763252 |
| 400513 | 1.415243 | 1.423848 | 1.405611 | 1.439067 | 0.397626 |

In FIG. 17, plots of transverse ray error as a function of normalized aperture height are shown for the lens triplet of FIG. 16 for each of five arbitrarily selected wavelengths in the ultraviolet and visible regions of the electromagnetic spectrum—viz., a central wavelength 0.40 micron, and wavelengths taken successively on either side thereof at 0.35 micron, 0.50 micron, 0.30 micron and 0.70 micron. The curves in FIG. 17 are extremely close to each other at all points on the aperture, which indicates that the lens triplet of FIG. 16 exhibits substantially uniform performance throughout the ultraviolet and visible regions of the spectrum.

In FIG. 18, plots of optical path difference as a function of normalized aperture height are shown for the lens triplet of FIG. 16 for each of the same five arbitrarily selected wavelengths for which the data in FIG. 17 are plotted. It can be determined from the curves in FIG. 18 that the maximum optical path difference for the lens triplet of FIG. 16 throughout the ultraviolet and visible regions of the spectrum is less than $\lambda/3.6$ at any point on the aperture.

In FIG. 19, the root-mean-square (RMS) wavefront error of the lens triplet of FIG. 16 is plotted as a function of wavelength throughout the ultraviolet and visible portions of the electromagnetic spectrum from 0.30 micron to 0.90 micron. It is apparent from FIG. 19 that the lens triplet of FIG. 16 is well-corrected for chromatic aberration over a broad wavelength band extending from well into the ultraviolet region through the visible region to the near infrared region of the spectrum.

Indices of refraction in the visible region of the electromagnetic spectrum for the materials comprising the lens elements 41, 42 and 43 of the lens triplet of FIG. 16 at the same five representative visible wavelengths for which indices of refraction are in Tables III, VI and IX are tabulated as follows:

TABLE XII

| Material | $N_6$ | $N_7$ | $N_8$ | $N_9$ | $N_{10}$ |
| --- | --- | --- | --- | --- | --- |
| Sapphire | 1.768239 | 1.775605 | 1.764936 | 1.781224 | 1.763022 |
| 400513 | 1.401102 | 1.406572 | 1.398773 | 1.410948 | 1.397472 |

From plots of transverse ray error as a function of normalized aperture height at the ten different wavelengths for which indices of refraction are listed in Tables XI and XII, and at additional wavelengths in the near infrared region, it has been established that the lens triplet of FIG. 16 has a maximum wavefront error of $\lambda/3.6$ at any point on the aperture throughout the wavelength range from 0.30 micron to 0.90 micron. The lens triplet of FIG. 16 has a maximum RMS wavefront error of only $\lambda/11.7$ and an average RMS wavefront error of only $\lambda/19.3$ over the wavelength range from 0.30 micron to 0.90 micron.

In FIG. 20, the Strehl ratio for the lens triplet of FIG. 16 is plotted as a function of wavelength throughout the ultraviolet and visible portions of the electromagnetic spectrum from 0.30 micron to 0.90 micron. It is apparent from FIG. 20 that the Strehl ratio for the lens triplet of FIG. 16 is virtually unchanged throughout a wavelength range extending from deep in the ultraviolet region (i.e., less than 0.34 micron) to well into the near infrared region (i.e., greater than 0.7 micron).

Fifth Embodiment

In FIG. 21, a fifth embodiment of a lens triplet according to the present invention is illustrated in which a first fused silica lens element 51 forms one side of a container for a liquid lens element 52, and a second fused silica lens element 53 forms another side of the container for the liquid lens element 52. The fused silica lens elements 51 and 53 are coaxially disposed along an optic axis, and are mounted so as to contain the liquid lens element 52 therebetween. The liquid lens element 52 consists of siloxane, which is identified by the code designation "400513" in the U.S. Mil Spec system for identifying optical materials.

The lens triplet shown in FIG. 21 has an optical prescription specified in tabular format as follows:

TABLE XIII

| Surface No. | Radius (inches) | Thickness (inches) | $N_d$ | $V_d$ | Material |
|---|---|---|---|---|---|
| 1 | 2.1228 | 0.0148 | 1.458464 | 67.82 | Fused Silica |
| 2 | −0.4159 | 0.0100 | 1.401102 | 51.43 | 400513 |
| 3 | 0.3753 | 0.0148 | 1.458464 | 67.82 | Fused Silica |
| 4 | −0.9369 | 0.9937 | | | Air | where the surfaces of the lens elements are numbered consecutively from left to right along the optic axis in accordance with the same optical design convention as described above in connection with the embodiment illustrated in FIG. 1. The aperture stop is at surface No. 1.

The indices of refraction for the materials comprising the lens elements 51, 52 and 53 of the lens triplet of FIG. 21 at the same five representative ultraviolet wavelengths for which indices of refraction are listed in Tables II, V, VIII and XI are tabulated as follows:

TABLE XIV

| Material | $N_1$ | $N_2$ | $N_3$ | $N_4$ | $N_5$ |
|---|---|---|---|---|---|
| Fused Silica | 1.470116 | 1.476891 | 1.462326 | 1.487793 | 1.455293 |
| 400513 | 1.415243 | 1.423848 | 1.405611 | 1.439067 | 1.397626 |

In FIG. 22, plots of transverse ray error as a function of normalized aperture height are shown for the lens triplet of FIG. 21 for each of the same five arbitrarily selected wavelengths (viz., 0.40 micron, 0.35 micron, 0.50 micron, 0.30 micron and 0.70 micron) for which plots of transverse ray error as a function of normalized aperture height are shown in FIG. 17 for the lens triplet of FIG. 16. The curves in FIG. 22 are extremely close to each other at all points on the aperture, which indicates that the lens triplet of FIG. 21 exhibits substantially uniform performance throughout the ultraviolet and visible regions of the spectrum.

In FIG. 23, plots of optical path difference as a function of normalized aperture height are shown for the lens triplet of FIG. 21 for each of the same five arbitrarily selected wavelengths (viz., 0.40 micron, 0.35 micron, 0.50 micron, 0.30 micron and 0.70 micron). It can be determined from the curves in FIG. 23 that the maximum optical path difference for the lens triplet of FIG. 21 throughout the ultraviolet and visible regions of the spectrum is less than $\lambda/3.5$ at any point on the aperture.

In FIG. 24, the root-mean-square (RMS) wavefront error of the lens triplet of FIG. 21 is plotted as a function of wavelength throughout the ultraviolet and visible portions of the electromagnetic spectrum from 0.30 micron to 0.80 micron. It is apparent from FIG. 24 that the lens system of FIG. 21 is well-corrected for chromatic aberration over a broad wavelength band extending from well into the ultraviolet region through the visible region to the near infrared region of the spectrum.

Indices of refraction in the visible region of the electromagnetic spectrum for the materials comprising the lens elements 51, 52 and 53 of the lens triplet of FIG. 21 at the same five representative visible wavelengths for which indices of refraction are listed in Tables III, VI, IX and XII are tabulated as follows:

TABLE XV

| Material | $N_6$ | $N_7$ | $N_8$ | $N_9$ | $N_{10}$ |
|---|---|---|---|---|---|
| Fused Silica | 1.458464 | 1.463127 | 1.456367 | 1.466692 | 1.455146 |
| 400513 | 1.401102 | 1.406572 | 1.398773 | 1.410948 | 1.397472 |

From plots of transverse ray error as a function of normalized aperture height at the ten different wavelengths for which indices of refraction are listed in Tables XIV and XV, and at additional wavelengths in the near infrared region, it has been established that the lens triplet of FIG. 21 has a maximum wavefront error of $\lambda/3.5$ at any point on the aperture throughout the wavelength range from 0.30 micron to 0.80 micron. The lens triplet of FIG. 21 has a maximum RMS wavefront error of only $\lambda/9.5$ and an average RMS wavefront error of only $\lambda/16.8$ over the wavelength range from 0.30 micron to 0.80 micron.

In FIG. 25, the Strehl ratio for the lens triplet of FIG. 21 is plotted as a function of wavelength throughout the ultraviolet and visible portions of the electromagnetic spectrum from 0.30 micron to 0.80 micron. It is apparent from FIG. 25 that the Strehl ratio for the lens triplet of FIG. 21 is virtually unchanged throughout a wavelength range extending from deep in the ultraviolet region (i.e., less than 0.34 micron) to well into the near infrared region (i.e., greater than 0.7 micron).

Sixth Embodiment

In FIG. 26, a second embodiment of a lens triplet according to the present invention is illustrated in which a first potassium bromide (KBr) lens element 61 forms one side of a container for a liquid lens element 62, and a second potassium bromide lens element 63 forms another side of the container for the liquid lens element 62. The KBr lens elements 61 and 63 are coaxially disposed along an optic axis, and are mounted so as to contain the liquid lens element 22 therebetween. The KBr lens elements 21 and 23 can be obtained from, e.g., Solon Technologies Inc. of Solon, Ohio. The liquid lens element 62 consists of siloxane, which is identified by the code designation "400513" in the U.S. Mil Spec system for identifying optical materials.

The lens triplet shown in FIG. 26 has an optical prescription specified in tabular format as follows:

TABLE XVI

| Surface No. | Radius (inches) | Thickness (inches) | $N_d$ | $V_d$ | Material |
|---|---|---|---|---|---|
| 1 | −85.9965 | 0.0148 | 1.559948 | 33.67 | KBr |
| 2 | 3.4966 | 0.0100 | 1.401102 | 51.43 | 400513 |
| 3 | −0.1691 | 0.0148 | 1.559948 | 33.67 | KBr |
| 4 | −0.2845 | 1.0106 | | | Air | where the surfaces of the lens elements are numbered consecutively from left to right along the optic axis in accordance with the same optical design convention as described above in connection with the embodiment illustrated in FIG. 1. The aperture stop is at surface No. 1.

The indices of refraction for the materials comprising the lens elements 61, 62 and 63 of the lens triplet of FIG. 26 at the same five representative ultraviolet wavelengths for which indices of refraction are listed in Tables II, V, VIII, XI and XIV are tabulated as follows:

TABLE XVII

| Material | $N_1$ | $N_2$ | $N_3$ | $N_4$ | $N_5$ |
|---|---|---|---|---|---|
| KBr | 1.591173 | 1.611685 | 1.569632 | 1.648243 | 1.552782 |
| 400513 | 1.415243 | 1.423848 | 1.405611 | 1.439067 | 1.397626 |

In FIG. 27, plots of transverse ray error as a function of normalized aperture height for the lens triplet of FIG. 26 are shown for each of the same five arbitrarily selected wavelengths (viz., 0.40 micron, 0.35 micron, 0.50 micron, 0.30 micron and 0.70 micron) for which plots of transverse ray error as a function of normalized aperture height are shown in FIGS. 17 and 22 for the lens triplets of FIGS. 16 and 21, respectively. The curves in FIG. 27 are extremely close to each other at all points on the aperture, which indicates that the lens system exhibits substantially uniform performance throughout the ultraviolet and visible regions of the spectrum.

In FIG. 28, plots of optical path difference as a function of normalized aperture height for the lens triplet of FIG. 26 are shown for each of the same five arbitrarily selected wavelengths (viz., 0.40 micron, 0.35 micron, 0.50 micron, 0.30 micron and 0.70 micron). It can be determined from the curves in FIG. 28 that the maximum optical path difference for the lens triplet of FIG. 26 throughout the ultraviolet and visible regions of the spectrum is less than $\lambda/5.0$ at any point on the aperture.

In FIG. 29, the root-mean-square (RMS) wavefront error of the lens triplet of FIG. 26 is plotted as a function of wavelength throughout the ultraviolet and visible portions of the electromagnetic spectrum from 0.30 micron to 0.90 micron. It is apparent from FIG. 29 that the lens triplet of FIG. 26 is well-corrected for chromatic aberration over a broad wavelength band extending from well into the ultraviolet region through the visible region to the near infrared region of the spectrum.

Indices of refraction in the visible region of the electromagnetic spectrum for the materials comprising the lens elements 61, 62 and 63 of the lens triplet of FIG. 26 at the same five representative visible wavelengths for which indices of refraction are listed in Tables III, VI, IX, XII and XV are tabulated as follows:

TABLE XVIII

| Material | $N_6$ | $N_7$ | $N_8$ | $N_9$ | $N_{10}$ |
|---|---|---|---|---|---|
| KBr | 1.559948 | 1.571734 | 1.555104 | 1.581421 | 1.552475 |
| 400513 | 1.401102 | 1.406572 | 1.398773 | 1.410948 | 1.397472 |

From plots of transverse ray error as a function of normalized aperture height at the ten different wavelengths for which indices of refraction are listed in Tables XVII and XVIII, and at additional wavelengths in the near infrared region, it has been established that the lens triplet of FIG. 26 has a maximum wavefront error of $\lambda/5.0$ at any point on the aperture throughout the wavelength range from 0.30 micron to 0.90 micron. The lens triplet of FIG. 26 has a maximum RMS wavefront error of only $\lambda/12.1$ and an average RMS wavefront error of only $\lambda/20.1$ over the wavelength range from 0.30 micron to 0.90 micron.

In FIG. 30, the Strehl ratio for the lens triplet of FIG. 26 is plotted as a function of wavelength throughout the ultraviolet and visible portions of the electromagnetic spectrum from 0.30 micron to 0.90 micron. It is apparent from FIG. 30 that the Strehl ratio for the lens triplet of FIG. 26 is virtually unchanged throughout a wavelength range extending from deep in the ultraviolet region (i.e., less than 0.34 micron) to well into the near infrared region (i.e., greater than 0.7 micron).

The present invention has been described above in terms of certain exemplary embodiments. However, practitioners skilled in the art of optical design, after having perused the foregoing description and the accompanying drawing, could readily develop design forms for other embodiments without departing from the scope of the present invention. Therefore, the present invention is defined more generally by the following claims and their equivalents.

We claim:

1. A lens system comprising a first rigid lens element, a second rigid lens element and a liquid lens element, said liquid lens element being contained between said first and second rigid lens elements, said first and second rigid lens elements and said liquid lens element co-acting with each other to cause said lens system to have a Strehl ratio greater than 0.60 over a continuous ultraviolet wavelength band from 0.30 micron to 0.45 micron and wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | 0.8172 | 0.0148 | 1.768239 | 72.01 | Sapphire |
| 2 | 0.2509 | 0.0250 | 1.296386 | 100.98 | 295990 (perfluorocarbon) |
| 3 | −0.0840 | 0.0148 | 1.768239 | 72.01 | Sapphire |
| 4 | −0.1077 | 1.0594 | | | Air | where the surfaces of the lens elements are numbered consecutively from left to right along an optic axis, and where $N_d$ is the index of refraction at the wavelength of the sodium d spectral line and $V_d$ is the Abbe number at the same wavelength.

2. A lens system comprising a first rigid lens element, a second rigid lens element and a liquid lens element, said liquid lens element being contained between said first and second rigid lens elements, said first and second rigid lens elements and said liquid lens element co-acting with each other to cause said lens system to have a Strehl ratio greater than 0.60 over a continuous ultraviolet wavelength band from 0.30 micron 0.45 micron and wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | −0.6614 | 0.0148 | 1.458464 | 67.82 | Fused Silica |
| 2 | 3.9902 | 0.0185 | 1.296386 | 100.98 | 295990 (perfluorocarbon) |
| 3 | −0.0917 | 0.0148 | 1.458464 | 67.82 | Fused Silica |
| 4 | −0.1355 | 1.0363 | | | Air | where the surfaces of the lens elements are numbered consecutively from left to right along an optic axis, and where $N_d$ is the index of refraction at the wavelength of the sodium d spectral line and $V_d$ is the Abbe number at the same wavelength.

3. A lens system comprising a first rigid lens element, a second rigid lens element and a liquid lens element, said liquid lens element being contained between said first and second rigid lens elements, said first and second rigid lens elements and said liquid lens element co-acting with each other to cause said lens system to have a Strehl ratio greater than 0.60 over a continuous ultraviolet wavelength band from 0.30 micron to 0.45 micron and wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | 0.3648 | 0.0148 | 1.490371 | 44.41 | KCl |
| 2 | 0.4129 | 0.0100 | 1.296386 | 100.98 | 295990 (perfluorocarbon) |
| 3 | −0.3582 | 0.0100 | 1.490371 | 44.41 | KCl |
| 4 | −0.7453 | 0.9774 | | | Air | where the surfaces of the lens elements are numbered consecutively from left to right along an optic axis, and where $N_d$ is the index of refraction at the wavelength of the sodium d spectral line and $V_d$ is the Abbe number at the same wavelength.

4. A lens system comprising a first rigid lens element a second rigid lens element and a liquid lens element said liquid lens element being contained between said first and second rigid lens elements, said first and second rigid lens elements and said liquid lens element co-acting with each other to cause said lens system to have a Strehl ratio greater than 0.60 over a continuous ultraviolet wavelength band from 0.30 micron to 0.45 micron and wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | −1.0024 | 0.0148 | 1.768239 | 72.01 | Sapphire |
| 2 | −0.4342 | 0.0100 | 1.401102 | 51.43 | 400513 (siloxane) |
| 3 | −0.4732 | 0.0148 | 1.768239 | 72.01 | Sapphire |
| 4 | −5.8405 | 0.9975 | | | Air | where the surfaces of the lens elements are numbered consecutively from left to right along an optic axis, and where $N_d$ is the index of refraction at the wavelength of the sodium d spectral line and $V_d$ is the Abbe number at the same wavelength.

5. A lens system comprising a first rigid lens element a second rigid lens element and a liquid lens element, said liquid lens element being contained between said first and second rigid lens elements, said first and second rigid lens elements and said liquid lens element co-acting with each other to cause said lens system to have a Strehl ratio greater than 0.60 over a continuous ultraviolet wavelength band from 0.30 micron to 0.45 micron and wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | 2.1228 | 0.0148 | 1.458464 | 67.82 | Fused Silica |
| 2 | −0.4159 | 0.0100 | 1.401102 | 51.43 | 400513 (siloxane) |
| 3 | 0.3753 | 0.0148 | 1.458464 | 67.82 | Fused Silica |
| 4 | −0.9369 | 0.9937 | | | Air | where the surfaces of the lens elements are numbered consecutively from left to right along an optic axis, and where $N_d$ is the index of refraction at the wavelength of the sodium d spectral line and $V_d$ is the Abbe number at the same wavelength.

6. A lens system comprising a first rigid lens element, a second rigid lens element and a liquid lens element, said liquid lens element being contained between said first and second rigid lens elements, said first and second rigid lens elements and said liquid lens element co-acting with each other to cause said lens system to have a Strehl ratio greater than 0.60 over a continuous ultraviolet wavelength band from 0.30 micron to 0.45 micron and wherein said first and second rigid lens elements and said liquid lens element are configured and positioned with respect to each other according to a design form specified as follows:

| Surface No. | Radius (inches) | Thickness (inches) | $N_d$ | $V_d$ | Material |
|---|---|---|---|---|---|
| 1 | −85.9965 | 0.0148 | 1.559948 | 33.67 | KBr |
| 2 | 3.4966 | 0.0100 | 1.401102 | 51.43 | 400513 (siloxane) |
| 3 | −0.1691 | 0.0148 | 1.559948 | 33.67 | KBr |
| 4 | −0.2845 | 1.0106 | | | Air | where the surfaces of the lens elements are numbered consecutively from left to right along an optic axis, and where $N_d$ is the index of refraction at the wavelength of the sodium d spectral line and $V_d$ is the Abbe number at the same wavelength.

* * * * *